US012235378B2

(12) United States Patent
Duan et al.

(10) Patent No.: US 12,235,378 B2
(45) Date of Patent: Feb. 25, 2025

(54) ENHANCED ASSISTANCE DATA FOR RADIO FREQUENCY SENSING

(71) Applicant: QUALCOMM Incorporated, San Diego, CA (US)

(72) Inventors: Weimin Duan, San Diego, CA (US); Alexandros Manolakos, Escondido, CA (US); Hyojin Lee, San Diego, CA (US); Seyong Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/836,777

(22) Filed: Jun. 9, 2022

(65) Prior Publication Data

US 2023/0400549 A1 Dec. 14, 2023

(51) Int. Cl.
*G01S 7/00* (2006.01)
*G01S 13/00* (2006.01)
*G01S 13/56* (2006.01)

(52) U.S. Cl.
CPC ............ *G01S 7/006* (2013.01); *G01S 13/003* (2013.01); *G01S 13/56* (2013.01)

(58) Field of Classification Search
USPC .......................................................... 342/28
See application file for complete search history.

(56) References Cited

U.S. PATENT DOCUMENTS

2015/0181481 A1* 6/2015 Masini ................ H04W 36/322
 455/436
2021/0050974 A1* 2/2021 Manolakos ........... H04L 5/0091
2022/0171016 A1 6/2022 Manolakos et al.

FOREIGN PATENT DOCUMENTS

WO WO-2021092072 A1 5/2021

OTHER PUBLICATIONS

International Search Report and Written Opinion—PCT/US2023/016676—ISA/EPO—Jul. 3, 2023.

* cited by examiner

*Primary Examiner* — Vladimir Magloire
*Assistant Examiner* — Eric K Hodac
(74) *Attorney, Agent, or Firm* — Weaver Austin Villeneuve & Sampson LLP/QUALCOMM

(57) ABSTRACT

Radio frequency (RF) sensing of a target object by a wireless network is supported by a sensing node and a network node using sensing assistance data. The sensing assistance data may include information for Doppler estimation from received RF signals. The information for Doppler estimation, for example, may include an indication of phase coherency of RF signals, such as phase coherence found in positioning reference signal (PRS) resources, resource sets, transmission reception points (TRPs), frequency layer or any combination thereof. The sensing assistance data may include an association of PRS resources and reference point objects (RPOs) so RF signals reflected from the RPOs may be excluded from the sensing measurements. The sensing assistance data may include beam pattern information for PRS resources for beam coordination for RF sensing.

28 Claims, 15 Drawing Sheets

ENHANCED ASSISTANCE DATA FOR RADIO FREQUENCY SENSING

BACKGROUND

Field

Subject matter disclosed herein relates generally to wireless communication, and more specifically, to radio frequency sensing in a wireless communication system.

Information

Radar is a ranging technique that can be used to determine the distances of objects relative to a given location. A radar system operates by transmitting and receiving electromagnetic pulses. Some of the pulses reflect off objects or surfaces along the transmission path, producing "echoes." The radar system may determine the distances of the objects or surfaces based on a round trip time between the transmission of a pulse to the reception of an echo of that pulse.

In a monostatic radar system, the antennas used to transmit the pulses ("transmit antennas") are collocated with the antennas used to receive the echoes ("receive antennas"). For example, the transmit antennas and receive antennas are often disposed on the same device. This allows for simple synchronization between the timing of the transmitted pulses and the timing of the received echoes since the same device (or system) clock may be used for both. In a multi-static radar system, the transmit antennas are located a substantial distance away from the receive antennas. The spatial diversity afforded by multi-static radar systems provides a high accuracy of target location and allows different aspects of a target to be viewed simultaneously.

Radio frequency (RF) sensing is a technique, similar to (and may include) radar, that can be used to determine one or more of the presence, location, identity, or combination thereof of objects. RF sensing, for example, may be used in wireless communication systems, such as cellular communications system (5G and 5G beyond). With a large bandwidth allocated to, e.g., 5G and 5G beyond, cellular communications system RF sensing may be considered a critical feature in future cellular systems. Improvements for RF sensing are desired.

SUMMARY

Radio frequency (RF) sensing of a target object by a wireless network is supported by a sensing node and a network node using sensing assistance data. The sensing assistance data may include information for Doppler estimation from received RF signals. The information for Doppler estimation, for example, may include an indication of phase coherency of RF signals, such as phase coherence found in positioning reference signal (PRS) resources, resource sets, transmission reception points (TRPs), frequency layer or any combination thereof. The sensing assistance data may include an association of PRS resources and reference point objects (RPOs) so RF signals reflected from the RPOs may be excluded from the sensing measurements. The sensing assistance data may include beam pattern information for PRS resources for beam coordination for RF sensing.

In one implementation, a method performed by a sensing node in a wireless network for supporting radio frequency (RF) sensing in the wireless network, includes receiving sensing assistance data from a network node comprising information for Doppler estimation from RF signals; receiving the RF signals; and performing a Doppler estimation using the RF signals and the sensing assistance data.

In one implementation, a sensing node in a wireless network configured for supporting radio frequency (RF) sensing in the wireless network, includes at least one transceiver; at least one memory; and at least one processor coupled to the at least one transceiver, and the at least one memory, wherein the at least one processor is configured to: receive, via the at least one transceiver, sensing assistance data from a network node comprising information for Doppler estimation from RF signals; receive, via the at least one transceiver, the RF signals; and perform a Doppler estimation using the RF signals and the sensing assistance data.

In one implementation, a sensing node in a wireless network configured for supporting radio frequency (RF) sensing in the wireless network, includes means for receiving sensing assistance data from a network node comprising information for Doppler estimation from RF signals; means for receiving the RF signals; and means for performing a Doppler estimation using the RF signals and the sensing assistance data.

In one implementation, a non-transitory storage medium including program code stored thereon, the program code is operable to configure at least one processor in a sensing node in a wireless network for supporting radio frequency (RF) sensing in the wireless network, the program code comprising instructions to: receive sensing assistance data from a network node comprising information for Doppler estimation from RF signals; receive the RF signals; and perform a Doppler estimation using the RF signals and the sensing assistance data.

In one implementation, a method performed by a network node in a wireless network for supporting radio frequency (RF) sensing in the wireless network, includes obtaining sensing assistance data for a sensing node in the wireless network, the sensing assistance data comprising information for Doppler estimation from RF signals; and sending to the sensing node the sensing assistance data comprising the information for Doppler estimation from the RF signals.

In one implementation, a network node in a wireless network configured for supporting radio frequency (RF) sensing in the wireless network, includes at least one transceiver; at least one memory; and at least one processor coupled to the at least one transceiver, and the at least one memory, wherein the at least one processor is configured to: obtain sensing assistance data for a sensing node in the wireless network, the sensing assistance data comprising information for Doppler estimation from RF signals; and send, via the at least one transceiver, to the sensing node the sensing assistance data comprising the information for Doppler estimation from the RF signals.

In one implementation, a network node in a wireless network configured for supporting radio frequency (RF) sensing in the wireless network, includes means for obtaining sensing assistance data for a sensing node in the wireless network, the sensing assistance data comprising information for Doppler estimation from RF signals; and means for sending to the sensing node the sensing assistance data comprising the information for Doppler estimation from the RF signals.

In one implementation, a non-transitory storage medium including program code stored thereon, the program code is operable to configure at least one processor in a network node in a wireless network for supporting radio frequency (RF) sensing in the wireless network, the program code comprising instructions to: obtain sensing assistance data for a sensing node in the wireless network, the sensing assistance data comprising information for Doppler estimation from RF signals; and send to the sensing node the sensing assistance data comprising the information for Doppler estimation from the RF signals.

In one implementation, a method performed by a sensing node in a wireless network for supporting radio frequency (RF) sensing in the wireless network, includes receiving sensing assistance data from a network node comprising an association of at least one positioning reference signal (PRS) resource and at least one reference point object (RPO); receiving PRS resources; and performing sensing based on the PRS resources and the association of the at least one PRS resource and the at least one RPO.

In one implementation, a sensing node in a wireless network configured for supporting radio frequency (RF) sensing in the wireless network, includes at least one transceiver; at least one memory; and at least one processor coupled to the at least one transceiver, and the at least one memory, wherein the at least one processor is configured to: receive, via the at least one transceiver, sensing assistance data from a network node comprising an association of at least one positioning reference signal (PRS) resource and at least one reference point object (RPO); receive, via the at least one transceiver, PRS resources; and perform sensing based on the PRS resources and the association of the at least one PRS resource and the at least one RPO.

In one implementation, a sensing node in a wireless network configured for supporting radio frequency (RF) sensing in the wireless network, includes receive sensing assistance data from a network node comprising an association of at least one positioning reference signal (PRS) resource and at least one reference point object (RPO); receive PRS resources; and perform sensing based on the PRS resources and the association of the at least one PRS resource and the at least one RPO.

In one implementation, a non-transitory storage medium including program code stored thereon, the program code is operable to configure at least one processor in a sensing node in a wireless network for supporting radio frequency (RF) sensing in the wireless network, the program code comprising instructions to: receive sensing assistance data from a network node comprising an association of at least one positioning reference signal (PRS) resource and at least one reference point object (RPO); receive PRS resources; and perform sensing based on the PRS resources and the association of the at least one PRS resource and the at least one RPO.

In one implementation, a method performed by a network node in a wireless network for supporting radio frequency (RF) sensing in the wireless network, includes obtaining sensing assistance data for a sensing node in the wireless network, the sensing assistance data comprising an association of at least one positioning reference signal (PRS) resource and at least one reference point object (RPO); and sending to the sensing node the sensing assistance data comprising the association of the at least one PRS resource and the at least one RPO.

In one implementation, a network node in a wireless network configured for supporting radio frequency (RF) sensing in the wireless network, includes at least one transceiver; at least one memory; and at least one processor coupled to the at least one transceiver, and the at least one memory, wherein the at least one processor is configured to: obtain sensing assistance data for a sensing node in the wireless network, the sensing assistance data comprising an association of at least one positioning reference signal (PRS) resource and at least one reference point object (RPO); and send, via the at least one transceiver, to the sensing node the sensing assistance data comprising the association of the at least one PRS resource and the at least one RPO.

In one implementation, a network node in a wireless network configured for supporting radio frequency (RF) sensing in the wireless network, includes means for obtaining sensing assistance data for a sensing node in the wireless network, the sensing assistance data comprising an association of at least one positioning reference signal (PRS) resource and at least one reference point object (RPO); and means for sending to the sensing node the sensing assistance data comprising the association of the at least one PRS resource and the at least one RPO.

In one implementation, a non-transitory storage medium including program code stored thereon, the program code is operable to configure at least one processor in a network node in a wireless network for supporting radio frequency (RF) sensing in the wireless network, the program code comprising instructions to: obtain sensing assistance data for a sensing node in the wireless network, the sensing assistance data comprising an association of at least one positioning reference signal (PRS) resource and at least one reference point object (RPO); and send to the sensing node the sensing assistance data comprising the association of the at least one PRS resource and the at least one RPO.

In one implementation, a method performed by a sensing node in a wireless network for supporting radio frequency (RF) sensing in the wireless network, includes receiving sensing assistance data from a network node comprising beam pattern information for positioning reference signal (PRS) resources for beam coordination for RF sensing; receiving PRS resources; and performing sensing based on the PRS resources and the beam pattern information.

In one implementation, a sensing node in a wireless network configured for supporting radio frequency (RF) sensing in the wireless network, includes at least one transceiver; at least one memory; and at least one processor coupled to the at least one transceiver, and the at least one memory, wherein the at least one processor is configured to: receive, via the at least one transceiver, sensing assistance data from a network node comprising beam pattern information for positioning reference signal (PRS) resources for beam coordination for RF sensing; receive, via the at least one transceiver, PRS resources; and perform sensing based on the PRS resources and the beam pattern information.

In one implementation, a sensing node in a wireless network configured for supporting radio frequency (RF) sensing in the wireless network, includes means for receiving sensing assistance data from a network node comprising beam pattern information for positioning reference signal (PRS) resources for beam coordination for RF sensing; means for receiving PRS resources; and means for performing sensing based on the PRS resources and the beam pattern information.

In one implementation, a non-transitory storage medium including program code stored thereon, the program code is operable to configure at least one processor in a sensing node in a wireless network for supporting radio frequency (RF) sensing in the wireless network, the program code comprising instructions to: receive sensing assistance data from a network node comprising beam pattern information for positioning reference signal (PRS) resources for beam coordination for RF sensing; receive PRS resources; and performing sensing based on the PRS resources and the beam pattern information.

In one implementation, a method performed by a network node in a wireless network for supporting radio frequency (RF) sensing in the wireless network, includes obtaining sensing assistance data for a sensing node in the wireless network, the sensing assistance data comprising beam pattern information for positioning reference signal (PRS) resources for beam coordination for RF sensing; and sending to the sensing node the sensing assistance data comprising the beam pattern information for the PRS resources for beam coordination for RF sensing.

In one implementation, a network node in a wireless network configured for supporting radio frequency (RF) sensing in the wireless network, includes at least one transceiver; at least one memory; and at least one processor coupled to the at least one transceiver, and the at least one memory, wherein the at least one processor is configured to: obtain sensing assistance data for a sensing node in the wireless network, the sensing assistance data comprising beam pattern information for positioning reference signal (PRS) resources for beam coordination for RF sensing; and send, via the at least one transceiver, to the sensing node the sensing assistance data comprising the beam pattern information for the PRS resources for beam coordination for RF sensing.

In one implementation, a network node in a wireless network configured for supporting radio frequency (RF) sensing in the wireless network, includes means for obtaining sensing assistance data for a sensing node in the wireless network, the sensing assistance data comprising beam pattern information for positioning reference signal (PRS) resources for beam coordination for RF sensing; and means for sending to the sensing node the sensing assistance data comprising the beam pattern information for the PRS resources for beam coordination for RF sensing.

In one implementation, a non-transitory storage medium including program code stored thereon, the program code is operable to configure at least one processor in a network node in a wireless network for supporting radio frequency (RF) sensing in the wireless network, the program code comprising instructions to: obtain sensing assistance data for a sensing node in the wireless network, the sensing assistance data comprising beam pattern information for positioning reference signal (PRS) resources for beam coordination for RF sensing; and send to the sensing node the sensing assistance data comprising the beam pattern information for the PRS resources for beam coordination for RF sensing.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
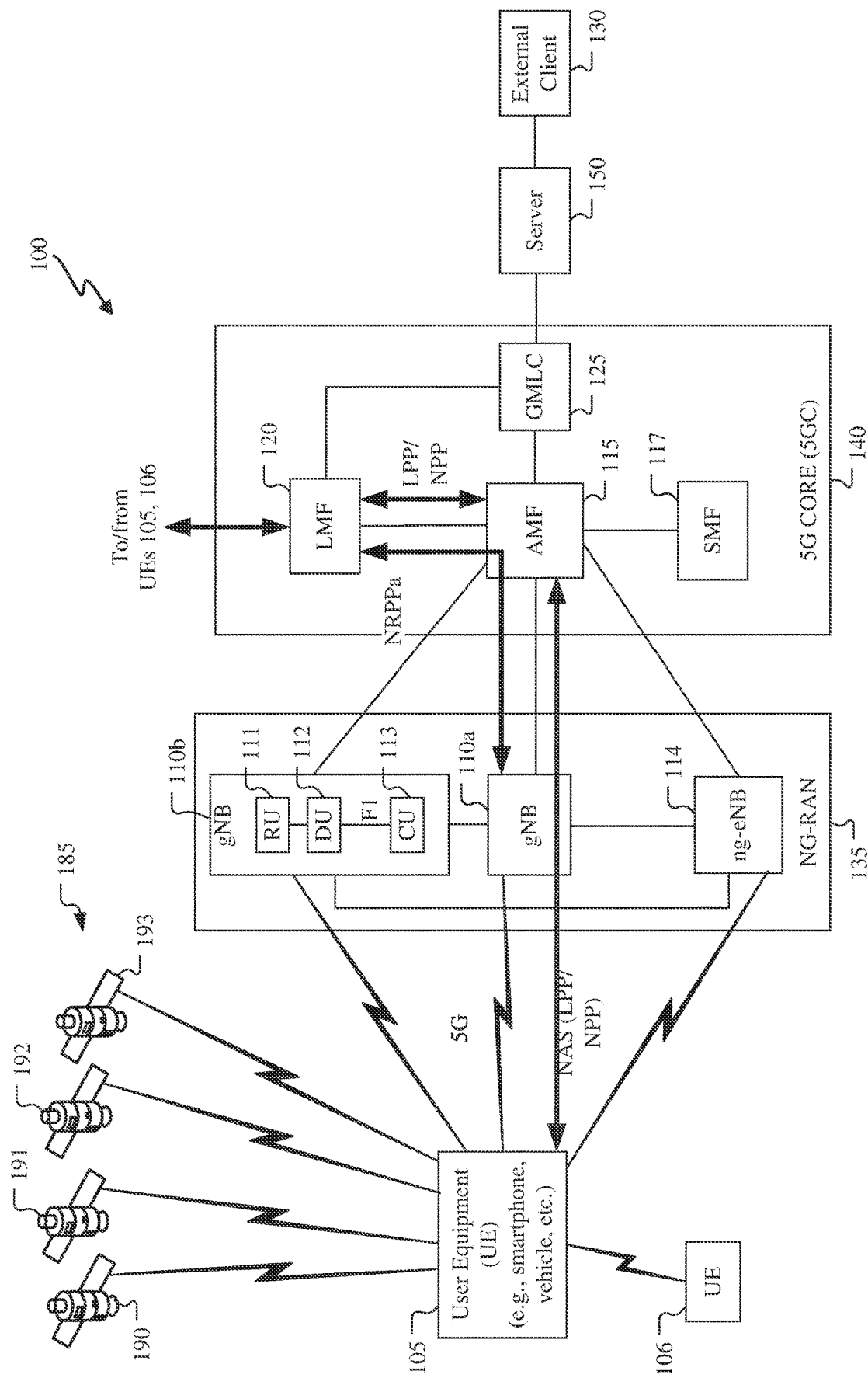
FIG. 1 illustrates an example wireless communications system that may be used for radio frequency (RF) sensing services, according to various aspects of the disclosure.

Techniques are discussed herein for radio frequency sensing. For example, a legacy positioning procedure (e.g., a New Radio user equipment positioning procedure) may be enhanced for radio frequency sensing using a reference signal (e.g., a channel state information reference signal or a positioning reference signal). As another example, a positioning reference signal may be scheduled and an indication provided that the positioning reference signal is to be used for radio frequency sensing. The positioning reference signal may also be used, and may be indicated to be used, for positioning. A positioning reference signal for sensing may be scheduled in the same frequency layer as a positioning reference signal for positioning. The indication that the positioning reference signal for sensing is to be used for sensing may comprise an indication that a frequency layer, that contains the positioning reference signal for sensing, is for sensing. These techniques are examples, and other implementations of techniques for radio frequency sensing may also or alternatively be used.

Items and/or techniques described herein may provide one or more of the following capabilities, as well as other capabilities not mentioned. Latency of radio frequency sensing may be reduced and/or kept low, e.g., when positioning and sensing are both performed. Priority of positioning and radio frequency sensing may be accommodated. Power consumption of a transmission/reception point and/or a user equipment may be saved. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on. UEs may be embodied by any of a number of types of devices including but not limited to printed circuit (PC) cards, compact flash devices, external or internal modems, wireless or wireline phones, smartphones, tablets, consumer asset tracking devices, asset tags, and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). A communication link through which a UE signals to another UE is called a sidelink (SL) or sidelink channel. As used herein, the term traffic channel (TCH) can refer to either an UL/reverse, DL/forward, or SL traffic channel.

The term "base station" may refer to a single physical transmission-reception point (TRP), which may also be referred to as a transmit/receive point, or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

A RF sensing system may employ a RF sensing server to support determining characteristics of one or more objects, such as the relative location, identity, motion state, etc., in a wireless network (e.g., a cellular network). The RF sensing server may be part of or accessible from a serving network or a home network for a UE or may simply be accessible over the Internet or over a local Intranet. With increasingly large bandwidths (BW) allocated for cellular communications system (5G and 5G beyond) and more use cases being introduced with cellular communications system, RF sensing may be considered a critical feature in future cellular systems.

Positioning services used in cellular communications systems, such as LTE and 5G NR, are well established. Sensing services for use in in cellular communications systems, on the other hand, are in development. A new RF sensing service may be enabled in a future cellular communication system, for example, using joint positioning and sensing services. For example, the upper layer (Medium Access Control (MAC) and above) procedures for UE positioning may be reused (or enhanced) for RF sensing services. In the physical (PHY) layer, the large bandwidth of the positioning reference signals (PRS) used in positioning procedures may makes it suitable for RF sensing.

In one or more implementations described herein, techniques, apparatus, and systems are provided to support RF sensing using sensing assistance data. The sensing assistance data, for example, may include information for Doppler estimation from received RF signals. To support Doppler estimation, phase coherency of the RF signals is needed. The sensing assistance data, thus, may include RF signals with phase coherency, such as positioning reference signal (PRS) resources, resource sets, transmission reception points (TRPs), frequency layer or any combination thereof. If PRS coherent transmissions are not supported, the sensing assistance data may identify reference signals are associated with PRS that support Doppler estimation. The sensing assistance data may include an indication of a search window for Doppler estimation, such as an expected Doppler and expected Doppler uncertainty.

In some implementations, the sensing assistance data may identify one or more reference point objects (RPOs) that are associated with one or more PRS resources. The RPOs, for example, present clutter in the received signals as the PRS may be reflected from the RPOs in addition to the target object. By removing the rejection of RPOs from the received RF signals, the sensing performance may be enhanced.

In some implementation, the sensing assistance data may provide beam pattern information for the PRS resources, e.g., to support beam coordination for RF sensing. The PRS beam pattern information, for example, may be similar to or may be the beam pattern information configured for UE based Angle of Departure (AoD) based positioning.

FIG. 1 illustrates an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150 that may be used for positioning services and may be used for RF sensing services as discussed herein. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). The system 100 may be capable of performing positioning services for UEs 105 and 106 based on wireless communications between components of the system 100. The system 100 may be further capable of performing sensing services using base stations, e.g., one or more of gNB 110, ng-eNB 114, and UEs 105 and 106 based on wireless communications between components of the system 100. For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150. Additionally or alternative, the server 150 may function as a sensing server, as discussed herein. The server 150, for example, may provide sensing assistance data to a sensing entity, e.g., UE 105 or base station 110, and may receive the sensing measurements and/or sensing estimates generated by the sensing entity based, at least partially, on the sensing assistance data. In some implementation, the server 150, when operating as the sensing server may be located externally to the 5GC 140 while in other locations the server 150 may be located within the 5GC 140.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS (Synchronization Signals) or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
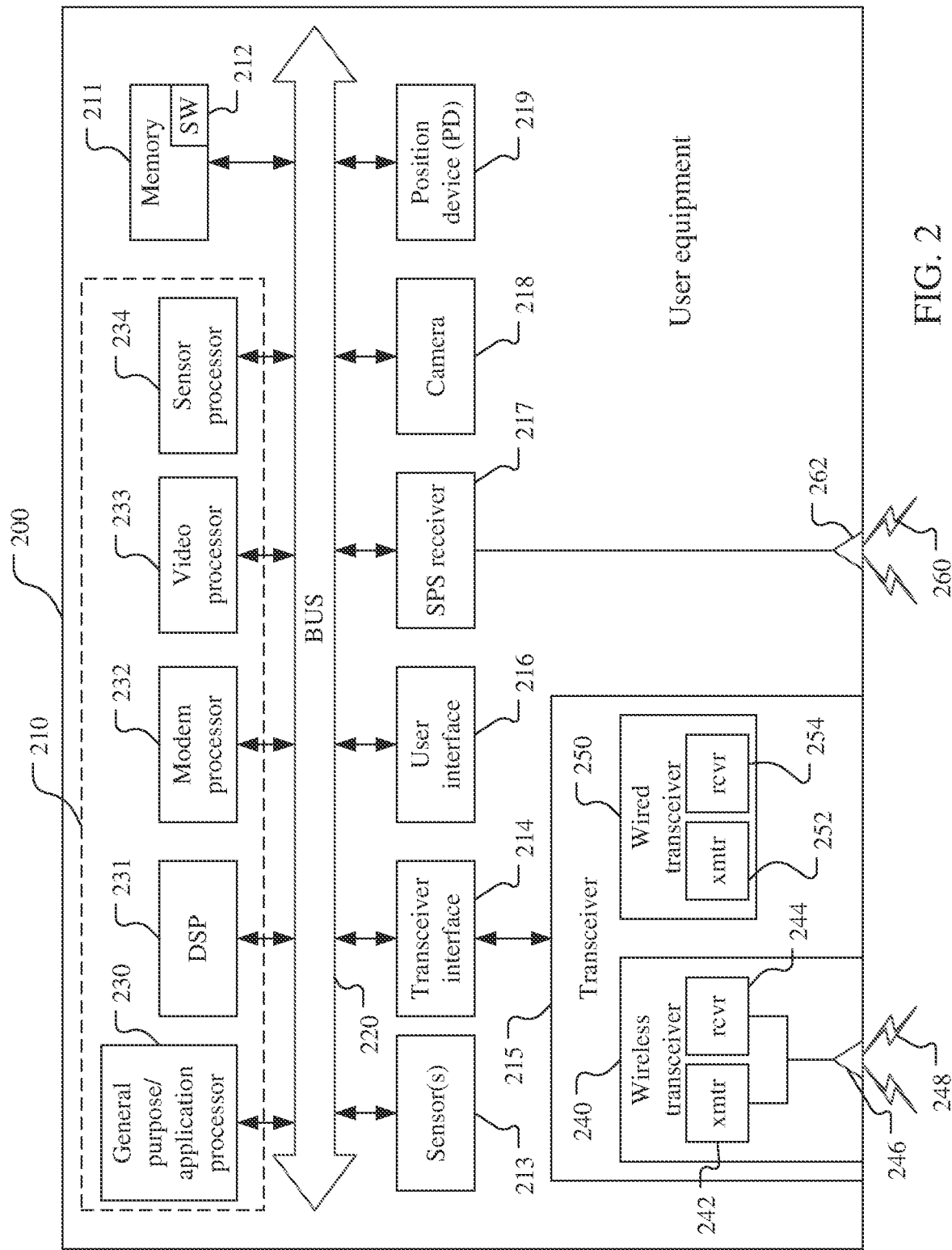
FIG. 2 illustrates a block diagram of a user equipment (UE), which may be one of the UEs in FIG. 1.

FIG. 2 illustrates a UE 200 that is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
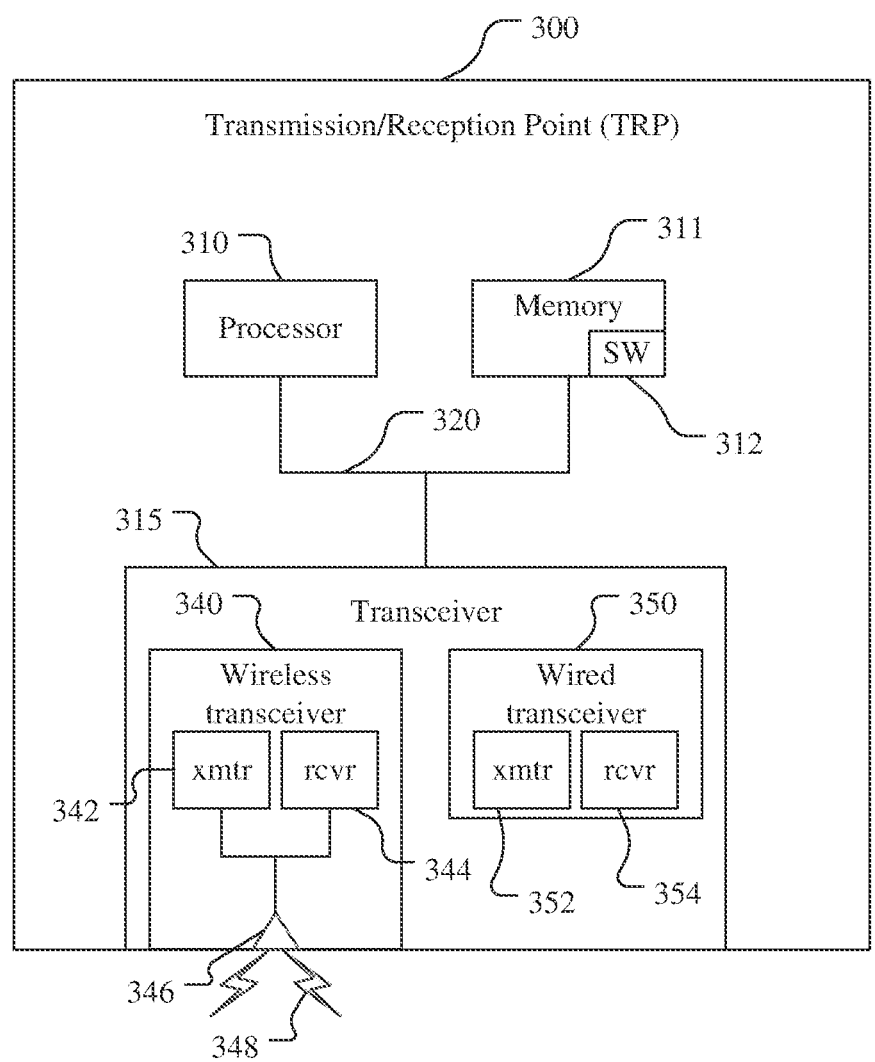
FIG. 3 illustrates a block diagram of a Transmission/Reception Point (TRP), which may be one of the base stations in FIG. 1.

FIG. 3 illustrates an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
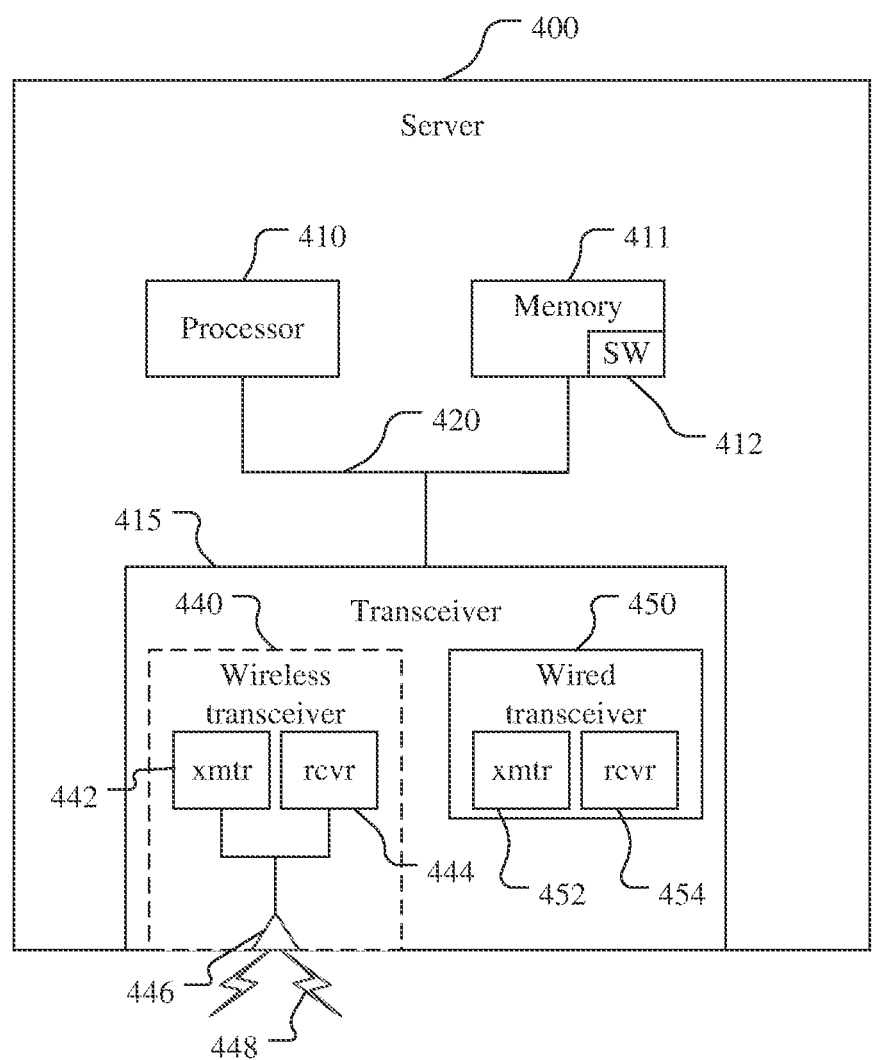
FIG. 4 illustrates a block diagram of a server, which may be one of the servers in FIG. 1.

FIG. 4 illustrates a server 400, of which the LMF 120 or server 150 may be an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., downlink positioning reference signals (PRS), cell-specific reference signal (CRS), etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE TRx-Tx or UERx-Tx) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS ((Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every Nth resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Radio Frequency Sensing

Radio frequency sensing (RF sensing) is a technique for sensing the presence and/or movement of one or more objects in an environment based, at least in part, on the transmission and reception of electromagnetic signals. RF sensing uses infrastructure (e.g., a base station and a UE) and time and frequency resources of a cellular communication system to measure an environment of a transmitting device and a receiving device to detect object presence and/or motion. Changes in the environment can be detected based on changes in a wireless communication channel between the transmitting device and the receiving device. For example, the presence or movement of the object(s) in the environment may interfere with or otherwise alter the phase or amplitude of wireless communication signals transmitted from the transmitting device, reflected by the object (s), and received by the receiving device, and thus, the wireless channel. The range of applications and/or accuracy of RF sensing may depend on an amount and/or detail of information communicated between the transmitting device and the receiving device.

A wireless communication network, e.g., conforming to the IEEE (Institute of Electrical and Electronics Engineers) 802.11 family of standards (such as a WLAN), may be used to implement an RF sensing system. The transmitting device may transmit a sounding dataset, over a wireless channel, to the receiving device. The sounding dataset may include information carried in one or more training fields configured for channel estimation and sounding control information based, at least in part, on a configuration of the transmitting device. The receiving device may acquire CSI for the wireless channel based on the received sounding dataset and selectively generate a channel report for the wireless channel based, at least in part, on the CSI and the sounding control information. For example, the receiving device may generate the channel report only when the characteristics of the wireless channel have changed by at least a threshold amount. The channel report may indicate changes to the wireless channel which, in turn, may be used to sense one or more objects in the vicinity of the transmitting device and/or the receiving device.

A CSI report may be provided, e.g., to a base station or other network entity, based on one or more measurements of CSI-RS (Channel State Information-Reference Signal(s)). For example, CSI may include CQI (Channel Quality Indicator(s)), RI (Rank Indicator(s)), and/or PMI (Precoding Matrix Indicator(s)) which may be derived from the one or more measurements of CSI-RS. Also or alternatively, CSI may include other information such as a CSI-RS Indicator (CRI), a Layer Indicator (LI), an SS/PBCH Block Resource Indicator (Synchronization Signal/Physical Broadcast Channel BRI (SSBRI)), and/or an L-1 RSRP (Layer 1 RSRP).

Techniques are discussed herein for using cellular communication systems (e.g., 5G and beyond) for RF sensing. Large bandwidths provided for such cellular communications systems may allow such cellular communication systems to provide accurate RF sensing services. Upper layer (e.g., MAC layer and above) procedures for positioning (e.g., NR UE positioning) may be reused or modified (e.g., enhanced) for providing RF sensing service. PRS may be used for RF sensing, e.g., due to the large bandwidth of PRS in the physical layer (PHY). For example, in FR1 (450 MHz-6 GHz (sub-6 GHz range)), PRS may have a bandwidth of 100 MHz, in FR2 (24.25 GHz-52.6 GHz (mmwave)), PRS may have a bandwidth of 400 MHz, and for FR3 (10 GHz-20 GHz, e.g., 13 GHz), PRS may have a bandwidth of 200 MHz. In terahertz (THz) signaling, PRS may have a bandwidth of 1 GHz or more (e.g., for short-range (e.g., several meters) RF sensing). Also, carrier aggregation may be used to increase the bandwidth of the PRS.

Figure 5:
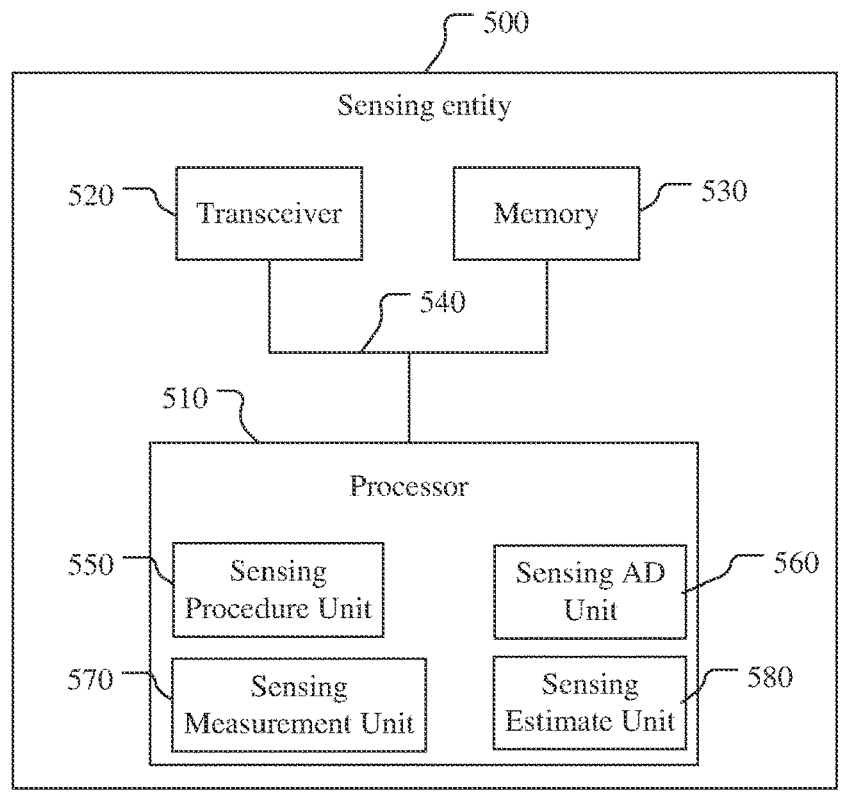
FIG. 5 illustrates a sensing entity that may be used for RF sensing as discussed herein.

FIG. 5 illustrates a sensing entity 500 that may be used for RF sensing as discussed herein. The sensing entity 500 includes a processor 510, a transceiver 520, and a memory 530 communicatively coupled to each other by a bus 540. The sensing entity 500 may be, for example, a UE or a base station. For example, the sensing entity 500 may include one or more other components such as any of those shown in FIG. 2 such that the UE 200 may be an example of the sensing entity 500, and/or any of the components shown in FIG. 3 such that the TRP 300 may be an example of the sensing entity 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions. As another example, the processor 510 may include one or more of the components of the processor 310, the transceiver 520 may include one or more of the components of the transceiver 315, and the memory 530 may be configured similarly to the memory 311, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the sensing entity 500 performing a function as shorthand for one or more appropriate components (e.g., the processor 510 and the memory 530) of the sensing entity 500 performing the function. The processor 510 (possibly in conjunction with the memory 530 and, as appropriate, the transceiver 520) may include one or more units or modules for performing the functions described herein. For example, the processor 510 may include a sensing procedure unit 550, a sensing assistance data (AD) unit 560, a sensing measurement unit 570 and a sensing estimate unit 580. The sensing procedure unit 550, sensing assistance data (AD) unit 560, sensing measurement unit 570 and sensing estimate unit 580 are discussed further below, and the description may refer to the processor 510 generally, or the sensing entity 500 generally, as performing any of the functions of the sensing procedure unit 550, sensing assistance data (AD) unit 560, sensing measurement unit 570 and sensing estimate unit 580. The sensing entity 500 is configured to perform the functions of the sensing procedure unit 550, sensing assistance data (AD) unit 560, sensing measurement unit 570 and sensing estimate unit 580 discussed herein.

Figure 6:
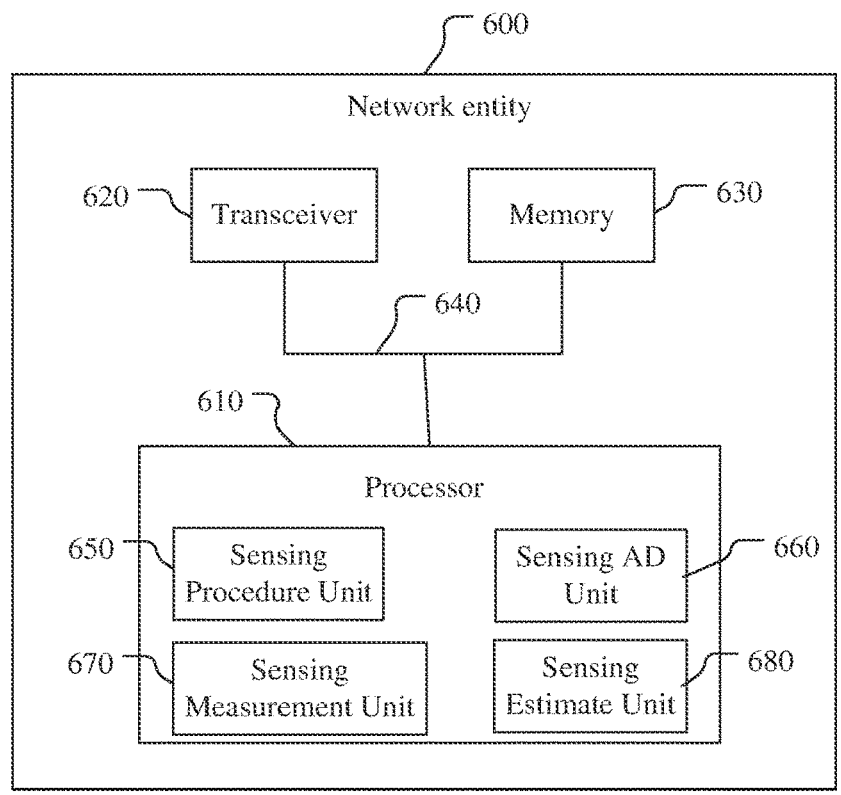
FIG. 6 illustrates a network entity that may be used for RF sensing as discussed herein.

FIG. 6 illustrates a network entity 600 that may be used for RF sensing as discussed herein. The network entity 600 includes a processor 610, a transceiver 620, and a memory 630 communicatively coupled to each other by a bus 640. The network entity 600 may include one or more other components such as any of those shown in FIG. 3 and/or FIG. 4 such that the TRP 300 and/or the server 400 may be an example of the network entity 600. For example, the processor 610 may include one or more of the components of the processor 310 and/or the processor 410. The transceiver 620 may include one or more of the components of the transceiver 315 and/or the transceiver 415. The memory 630 may be configured similarly to the memory 311 and/or the memory 411, e.g., including software with processor-readable instructions configured to cause the processor 610 to perform functions.

The description herein may refer to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include one or more units or modules for performing the functions described herein. For example, the processor 610 may include a sensing procedure unit 650, a sensing assistance data (AD) unit 660, a sensing measurement unit 670 and a sensing estimate unit 680. The sensing procedure unit 650, sensing assistance data (AD) unit 660, sensing measurement unit 670 and sensing estimate unit 680 are discussed further below, and the description may refer to the processor 610 generally, or the network entity 600 generally, as performing any of the functions of the sensing procedure unit 650, sensing assistance data (AD) unit 660, sensing measurement unit 670 and sensing estimate unit 680. The network entity 600 is configured to perform the functions of the sensing procedure unit 650, sensing assistance data (AD) unit 660, sensing measurement unit 670 and sensing estimate unit 680 discussed herein.

RF sensing may include a monostatic system or multi-static system. A monostatic system includes one device both transmitting the signals and receiving the reflections of the signals. A monostatic system may be for identifying a motion state of the transmitting/receiving device or for identifying an object in the transmitting/receiving device's environment. A multi-static system includes systems with a receiving device different than a transmitting device. For example, one or more transmitting devices transmit the signals, and one or more separate receiving devices receive reflections of the signals from an object. An example multi-static system is a bi-static system in which one transmitting device transmits and one receiving device receives, but any number of transmitting devices or receiving devices may exist. A multi-static system may be for identifying a motion state of the object reflecting the signals.

Figure 7:
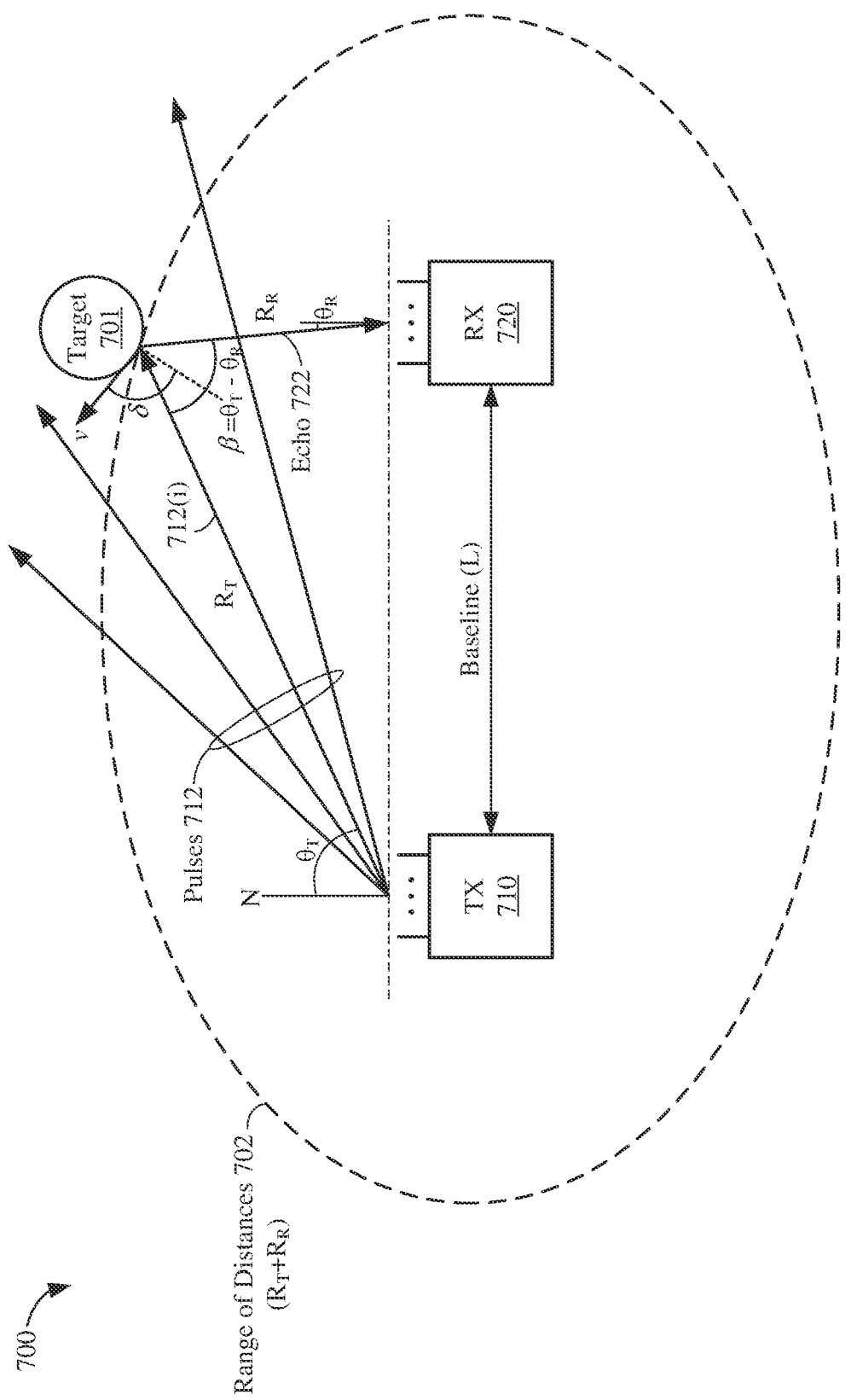
FIG. 7 illustrates an example of a bi-static radar system that may be used for RF sensing.

FIG. 7 shows an example bi-static RF sensing system 700. The bi-static system 700 includes a transmitter (TX) 710 and a receiver (RX) 720. The transmitter 710 and the receiver 720 are spatially separated by a baseline (L). In some implementations, the transmitter 710 may be one example of a base station 110 (or UE 105 or 106) and the receiver 720 may be an example of one of a different base station 102 (or UE 105 or 106) of FIG. 1. The transmitter 710 is configured to transmit pulses 712 in a number of directions. Each of the pulses 712 may be a beamformed RF signal having a particular width and directionality. Objects or surfaces along the trajectory of any of the pulses 712 may cause the pulses 712 to reflect or scatter. Reflected pulses may be referred to as "echoes" of the pulses from which they originate. In the example of FIG. 7, a target object 701 is located along the path of one of the pulses 712. The pulse 712(i) incident on the target object 701 is reflected as an echo 722. As shown in FIG. 7, the echo 722 is reflected in the direction of the receiver 720. The receiver 720 may determine ranging information about the target object 701 based, at least in part, on the timing of the echo 722. Example ranging information may include, but is not limited to, a distance, direction, or velocity of the target object 701.

In some implementations, the receiver 720 may determine a distance ($R_R$) of the target object 701 relative to the receiver 720 based, at least in part, on the baseline distance L (between the transmitter 710 and the receiver 720), an angle of arrival ($\theta_R$) of the echo 722, and a time of flight ($\tau$) from the transmission of the incident pulse 712(i) by the transmitter 710 to the reception of the resulting echo 722 by the receiver 720. More specifically, the distance $R_R$ can be calculated according to Equation 1.

$$R_R = \frac{(R_T + R_R)^2 - L^2}{2(R_T + R_R - L\cos\theta_R)} \quad (1)$$

where $R_T+R_R$ represents the combined distances from the target object 701 to each of the transmitter 710 and the receiver 720. As shown in FIG. 7, $R_T+R_R$ defines a range of distances 702 around the transmitter 710 and the receiver 720 (in the shape of an ellipse) in which the target object 701 may be located. More specifically, $R_T+R_R$ can be calculated, according to Equation 2, as a function of the baseline (L), the time of flight of the reflected pulse ($\tau$), and the propagation speed of the pulses ($c_p$).

$$R_T+R_R=c_p\tau+L \quad (2)$$

With reference to Equations 1 and 2, the baseline L and propagation speed $c_p$ represent fixed or preconfigured values inherent to the system 700. The angle of arrival $\theta_R$ may be determined based on a time difference of arrival (TDOA) of the echo 722 between different receive antennas of the receiver 720 in an antenna array or based on the antenna sector (corresponding to a preset beam of a phased array antenna) used by the receiver 720 to receive the echo 722. However, to calculate the time of flight $\tau$, the receiver 720 must have knowledge of the time at which the incident pulse 712($i$) was transmitted at the position of the receiver. More specifically, the time of flight $\tau$ can be calculated, according to Equation 3, as a function of the time of transmission of the incident pulse ($T_{pulse}$) and the time of reception of the echo ($T_{echo}$).

$$\tau=T_{echo}-T_{pulse} \quad (3)$$

For a stationary transmitter 710 and stationary receiver 720, the target bi-static Doppler frequency is given by:

$$f_D = \frac{2v}{c_p} * \cos\delta * \cos\left(\frac{\beta}{2}\right) \quad (4)$$

where v is the velocity of the target object 701, $\beta$ is the difference between the angle of departure $\theta_T$ and the angle of arrival $\theta_R$, and $\delta$ is the angle between the velocity vector v and the angle $\beta$.

Because the transmitter 710 and the receiver 720 are implemented in (or correspond to) separate wireless communication devices, the transmitter 710 may need to communicate the timing of the transmission of the incident pulse $T_{pulse}$ to the receiver 720. However, because the transmitter 710 transmits pulses 712 in a number of directions, the transmitter 710 may be unaware as to which of the pulses 712 is incident on the target object 701. Accordingly, the transmitter 710 may need to communicate the timing of each of the pulses 712 to the receiver 720, and the receiver 720 may need to determine which of the pulses 712 resulted in the echo 722. In some implementations, packet formats in accordance with IEEE 802.11 standards or messages in accordance with 3GGP standards may be used to communicate such timing information ($T_{pulse}$) from the transmitter 710 to the receiver 720.

In some implementations, the transmitter 710 may transmit timing information followed by a synchronization sequence (not shown for simplicity) to the receiver 720 prior to transmitting the pulses 712. The timing information can be used to synchronize a receiver clock of the receiver 720 with a transmit clock of the transmitter 710. For example, the timing information may indicate a timing offset or delay between one or more portions of the synchronization sequence and the beginning of the transmission of the pulses 712. Thus, upon detecting at least a portion of the synchronization sequence and the subsequent echo 722, the receiver 720 may determine the exact time at which the incident pulse 712($i$) was transmitted by the transmitter 710. The receiver 720 may compare the timing of the echo $T_{echo}$ with the timing of the transmitted pulse $T_{pulse}$ to determine the distance $R_R$ of the target object 701 (such as described with respect to Equations 1-3).

In some implementations, the transmitter 710 also may determine ranging information regarding the target object 701. For example, the transmitter 710 may determine its relative distance $R_T$ to the target object 701. For example, in some aspects, the receiver 720 may provide feedback regarding the echo 722 to the transmitter 710. The feedback may include the timing of the echo $T_{echo}$, the timing of the transmitted pulse $T_{pulse}$, the time of flight $\tau$, the angle of arrival $\theta_R$, the calculated distance $R_R$, or any combination thereof. The transmitter 710 may then calculate the distance $R_T$ of the target object 701 based, at least in part, on the angle of departure $\theta_T$ of the incident pulse 712($i$). For example, the transmitter 710 may calculate the distance $R_T$ by substituting the angle of departure $\theta_T$ for the angle of arrival $\theta_R$ in Equation 1. The transmitter 710 may determine the angle of departure $\theta_T$ based on the antenna sector (corresponding to a particular beam of a phased array antenna) used by the transmitter 710 to transmit the incident pulse 712($i$).

One of the important measurements for RF sensing is Doppler estimation. Doppler estimation, however, is not supported by current positioning procedures, e.g., in NR or LTE. Accordingly, for RF sensing in a wireless network, such as system 100, support for Doppler estimation must be provided. In one implementation, to support RF sensing, assistance data may be provided to the sensing node, e.g., the UE 105 or base station 110, with information that may be used for Doppler estimation from the RF signals. For example, due to the large bandwidth of positioning reference signals (PRS) that are used for positioning, PRS may be suitable for use for RF sensing, e.g., for the pulses 712 shown in FIG. 7. Doppler measurement is not supported by the current PRS used in NR or LTE. For example, phase coherency is not guaranteed for PRS, e.g. in either NR or LTE. Phase coherency, however, is critical for Doppler estimation (e.g., discussed in equation 4) and Doppler estimation is a critical RF sensing measurement. Accordingly, where PRS is used for RF sensing, the information for Doppler estimation that may be provided in assistance data to the sensing node may include an indication of phase coherency of PRS.

The indication of PRS phase coherency may be provided in the assistance data in various ways. For example, in one implementation, the assistance data may indicate specific PRSs (e.g., PRS resources) or a group of PRS (resource set) with phase coherency. The sensing node, e.g., UE 105 or base station 110, may use the one or more beams (resources) from the indicated group (resource set) of PRS for the Doppler estimation and report the result.

In another implementation, the assistance data may indicate specific TRPs that support transmission of PRS with phase coherency. The sensing node, e.g., UE 105 or base station 110, may use the PRS received from the indicated TRPs for the Doppler estimation. The assistance data may further indicate a specific group (resource set) of PRS associated with a TRP that has phase coherency, e.g., if not all resource sets associated with that TRP do not support PRS phase coherency. This implementation may reduce signaling overhead because some TRPs may always support PRS phase coherency. For example, some gNB vendors may support phase coherency for some deployments. The sensing node, e.g., UE 105 or base station 110, may use PRS from the group of PRS associated with the indicated TRPs for the Doppler estimation.

In another implementation, the assistance data may indicate a specific frequency layer that supports transmission of PRS with phase coherency. For example, the assistance data may indicate a frequency layer that may be used for RF sensing, and because Doppler estimation is important for most of the sensing use cases, an indication that the frequency layer may be used for RF sensing implicitly indicate that the PRS configured under that specific frequency layer by default support Doppler estimation. The sensing node, e.g., UE 105 or base station 110, may use the PRS received in the frequency layer for the Doppler estimation. In some implementations, the assistance data may indicate the PRS, e.g., one or more of the resources, resource set, and TRP, that do not support Doppler estimation (for example, due to hardware limitation, phase coherence may be challenging for two PRS resources that are always far in the time domain. The sensing node, e.g., UE 105 or base station 110, may exclude from the Doppler estimation any PRS that is identified as not supporting Doppler estimation.

Thus, the indication of phase coherency of the PRS that is provided in assistance data for RF sensing may include any combination of frequency layer, transmission reception point (TRP), PRS resource set, and PRS resource.

There are base station deployments, e.g., by some gNB vendors, that may not support phase coherency in PRS transmissions. In such instances, other reference signals that may support Doppler estimation may be associated with PRS to enable Doppler estimation. The information for Doppler estimation provided in assistance data, in this implementation, may indicate the PRS and reference signals that are associated for Doppler estimation, i.e., the specific reference signals that are associated with PRS that the sensing node may be use for Doppler estimation. For example, the association between PRS and other reference signals for Doppler estimation may be Quasi-Colocation (QCL) signals, e.g., which may be implemented by a QCL-Type A configuration, QCL-Type B configuration or QCL-Type C configuration. The associated reference signal may be a narrowband reference signal, but should be configured close with the PRS in time domain. By way of example, a reference signal that may be associated with PRS for Doppler estimation is a tracking reference signal (TRS). In some implementations, the reference signal that may be associated with PRS for Doppler estimation may be a non-NR signal, such as a radar waveform. For example, a radar waveform may be associated with PRS for Doppler estimation if the PRS and associated radar waveform are transmitted from the transmitters that are co-located or even by the same transmitter. If a radar waveform is associated with PRS for Doppler estimation, the information for Doppler estimation provided in assistance data may further include the configuration of the radar waveform, such as the waveform type and parameters for the radar waveform.

Based on the sensing measurements collected at the server, the server may also include as part of the information for Doppler estimation in assistance data the search window for the Doppler estimation, e.g., including an expected Doppler (ExpectedDoppler) and expected Doppler uncertainty (ExpectedDoppler-Uncertainty). For example, if the RF signals used for Doppler estimation are PRS, the server may define multiple sets of the expected Doppler and expected Doppler uncertainty, e.g., with a different set for each PRS resource or a group of PRS (resource set). If the assistance data is sensing node specific, each set of expected Doppler and expected Doppler uncertainty may be associated with a path index. The path index, for example, is the channel impulse response tap index relative to the first arrival path for the sensing node. In some implementations, the path index may be based on Cx1/Cx2 sampling. If the sensing node is a base station, such as gNB 110, the information for Doppler estimation may be provided to the base station by the server (or transmitting node) in appropriate messaging, which is referred to herein as assistance data.

Within a sensing environment, there may be multiple reference point objects (RPOs) in addition to the sensing target. The RPOs and the sensing target will all reflect RF signals, which will be received by the sensing node. Only the reflected signal from the sensing target, however, is desired for the sensing measurements.

Figure 8:
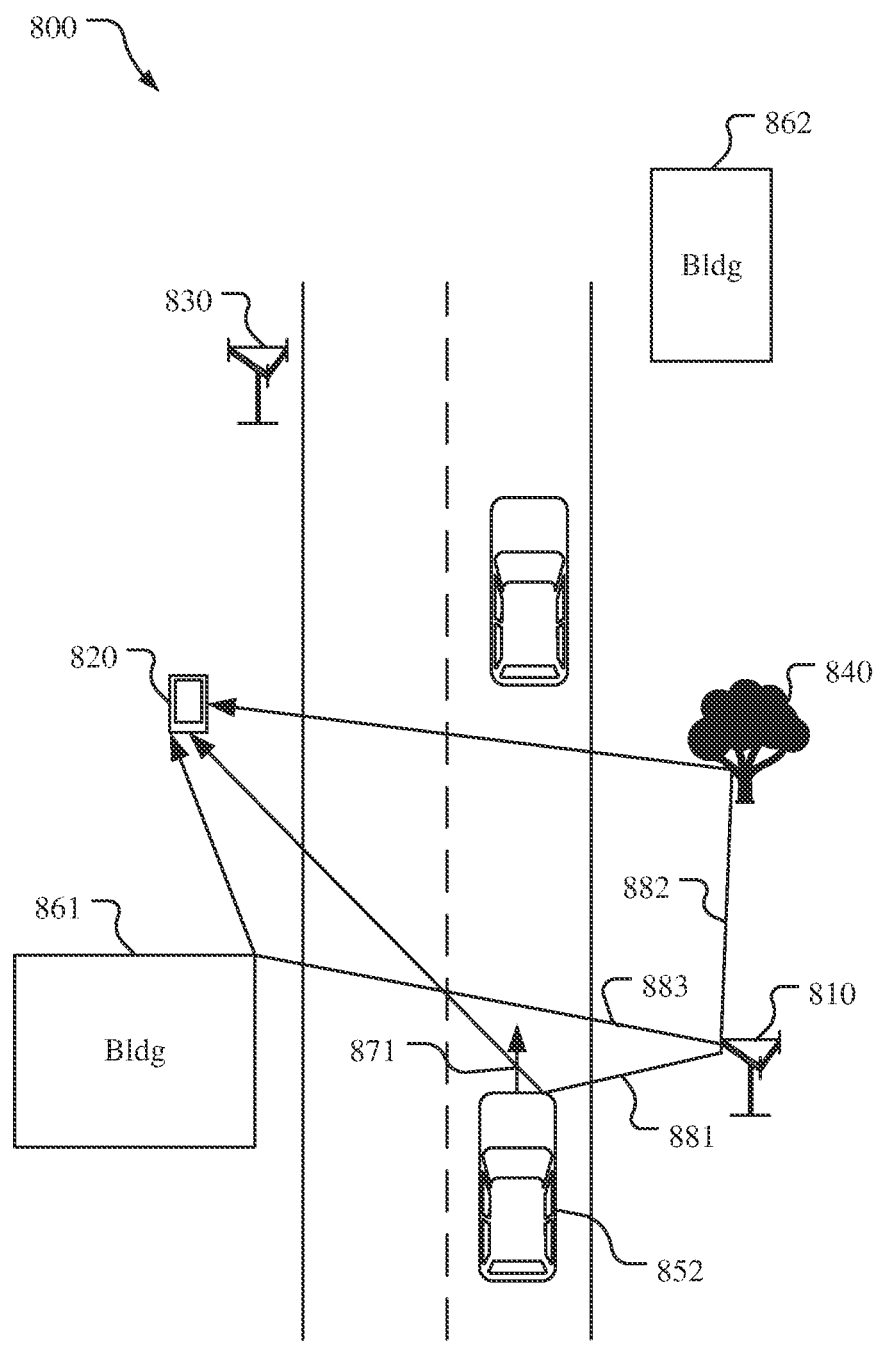
FIG. 8 illustrates a sensing environment that includes a sensing entity, a target object and a multiple reference point objects (RPOs).

FIG. 8, by way of example, illustrates a sensing environment 800 that includes a sensing receiver node 820 and a sensing transmitter node 810 that are configured for RF sensing of a target 852. The sensing receiver node 820 is illustrated as a UE (e.g., such as UE 105) and may sometimes be referred to herein as sensing node 820 or UE 820, and the sensing transmitter node 810 is illustrated as a base station (such as gNB 110), and may sometimes be referred to herein as transmitter node 810 or base station 810. For example, the base station 810 may be an example transmitter for RF sensing and the UE 820 and/or a base station 830 may be examples of the sensing entity 500 for sensing reference signals for RF sensing. The same entity, e.g., the base station 810 (or UE 820), may be a transmitter and a receiver of reference signals for RF sensing for mono-static RF sensing.

The base stations 810, 830 and the UE 820 may transmit and receive radio frequency reference signals in order to perform RF sensing of the target 852, illustrated as a vehicle, and which may sometimes be referred to herein as vehicle 852. For example, the base station 810 transmits signals 881, 882, 883 that reflect off the vehicle 852, tree 840, and building 861, respectively, and are received by the UE 820. The received reflected signals may be measured to obtain one or more reference signal measurements and the measurement(s) may be used to determine one or more parameters based on the reference signal measurement(s), e.g., based on timing, magnitude, and direction of the received signals. The one or more parameters may include, for example, the presence of objects such as the tree 840, the vehicle 852, and the building 861, range(s) to one or more of the objects relative to one or more reference points, e.g., the base stations 810, 830 and/or the UE 820, direction of motion of one or more of the objects (relative to a reference such as a global direction reference), speed of one or more of the objects, etc. For example, a velocity 871 of the vehicle 852 may be determined relative to a global direction reference (e.g., north/east).

The stationary, persistent objects such as buildings 861, 862 and tree 840, may be treated as RPOs. Reflections of reference signals by the UE 820 from RPOs, such as building 861 and tree 840 is received along with the reflection for the target 852, but only the reflected signal from the target 852 may be desired for the sensing measurement. Accordingly, it may be desirable to determine and ignore the reflections from RPOs.

Accordingly, in one implementation, sensing assistance data may be provided to the sensing node from a network node, e.g., a server or the sensing transmitter node that includes an association of PRS resources and RPOs. The sensing of a target may then be performed based on the received PRS resources and the association of PRS resources and RPOs. For example, the PRS resources that are associated from RPOs may be excluded from the PRS resources that are used for performing sensing of the target.

The association of one or more PRS resources with one or more RPOs may be based on the three-dimensional (3D) maps of the environment generated in the network node, e.g., the server or sensing transmitter node. The network node, for example, may fuse sensing measurement reports from one or more sensing nodes and 3D maps to extract the RPOs. The RPOs, for example, reflect the RF signals with a high power than a moving sensing target and with zero Doppler, assuming the sensing node is substantially stationary (i.e., little or no movement between sensing measurement reports). The identified RPOs correspond to sources of clutter in reflected reference signals that may be received by the sensing node. Accordingly, the sensing node may remove reference signals associated with RPOS from the received reference signals to enhance the sensing performance.

By way of example, PRS resources associated with the RPOs that is provided in assistance data to the sensing node may be based on the location of the sensing node. The location of the sensing node may be obtained by the network node, e.g., from the sensing node. For example, the sensing node may obtain its position, e.g., from an SPS 185 as shown in FIG. 1 or from other positioning methods and may report its position to the network node. In another implementation, the network node may obtain the location of the sensing node from a database, e.g., where the sensing node is stationary and known, such as a base station or roadside unit (RSU). The network node may determine assistance data for the sensing node, including the PRS associated with RPOs with respect to the location of the sensing node and provide the assistance data to the sensing node.

The assistance data may include an association of PRS to RPOs, which may be one-to-many or many-to-one. By way of example, the assistance data may include an identifier (ID) and location of each of the RPOs that is associated with a PRS. For example, each PRS may be associated with a list of RPOs, each RPO in the list being associated with an RPO-ID and a RPO location. Table 1 illustrates an example of the association of PRS with RPS in one implementation.

TABLE 1

PRS resource 1 - RPO-Info:
RPO-Info:
   RPO1: {Location1, ID=0}
   RPO2: {Location2, ID=2}
...

The assistance data may further indicate advanced features of the RPO. For example, each RPO may be associated with at least one of a class, e.g., building, human, tree, etc., a radar cross section (RCS), a material, a size, a shape, or any combination thereof. Due to the beam-based operation, one PRS may be associated with different RPOs than is associated with another PRS. If the sensing node is a base station, such as gNB 110, the association of PRS resources and RPOs may be provided to the base station by the network node (e.g., server or transmitter node) in appropriate messaging, which is referred to herein as assistance data.

In another implementation, the beam pattern information for PRS used for positioning may be reused to support beam coordination for RF sensing. For example, assistance data may be sent to a sensing node from a network node, e.g., a server or the sensing transmitting node, that includes beam pattern information for PRS resources for beam coordination for RF sensing. The sensing node may perform sensing based on received PRS resources and the beam pattern information.

Figure 9:
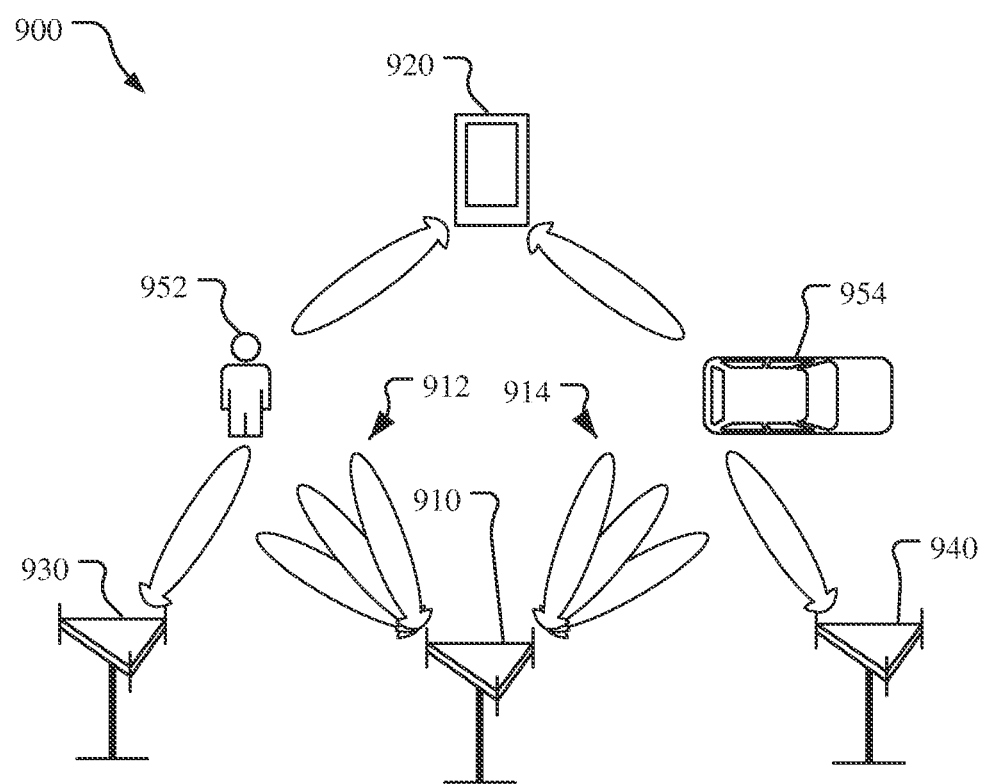
FIG. 9 illustrates a sensing environment that includes a transmitter node transmitting reference signals for sensing with beam patterns.

FIG. 9, by way of example, illustrates a sensing environment 900 that includes a sensing transmitter node 910 and multiple sensing receiver nodes 920, 930, and 940 that are configured for RF sensing of targets 952 and 954. The sensing receiver node 920 is illustrated as a UE (e.g., such as UE 105) and may sometimes be referred to herein as sensing node 920 or UE 920 and sensing receiver nodes 930 and 940 are illustrated as base stations (e.g., such as gNBs 110) and may sometimes be referred to herein as sensing nodes 930, 940, or base stations 930, 940. The sensing transmitter node 910 is illustrated as a base station (such as gNB 110), and may sometimes be referred to herein as transmitter node 910 or base station 910. For example, the base station 810 may be an example transmitter for RF sensing and the UE 920 and/or a base stations 930, 940 may be examples of the sensing entity 500 for sensing reference signals for RF sensing. The same entity, e.g., the base station 910 may be a transmitter and a receiver of reference signals for RF sensing for mono-static RF sensing.

Base station 910 is illustrated as transmitting PRS in different beam patterns 912 and 914. The beam pattern information for beam patterns 912 and 914 may be provided to the UE 920 and base stations 930, 940, which may be used to support beam coordination for RF sensing of the targets 952 and 954. For example, with the beam pattern information, the UE 920 and base station 930 may use beam coordination for RF sensing of the target 952 using the PRS resources in beam patterns 912, while the UE 920 and base station 940 may use beam coordination for RF sensing of the target 954 using PRS resources in beam patterns 914. By way of example, the beam pattern information may provide an indication of beam direction, which may be used by the UE 920 and base stations 930 and 940 to determine the reception of PRS resources reflected from the target, e.g., based on a known orientation of the sensing node with respect to the transmitting node and/or the target. For example, the sensing node may identify any line of sight (LOS) PRS resources, which is not reflected from the target based on AoD and known orientations of the sensing node with respect to the transmitting node. The sensing node may further identify which non-line of sight (NLOS) PRS resource is reflected from the target based on AoD and known orientations of the sensing node with respect to the transmitting node and target node.

Currently, PRS beam pattern information is only configured for UE based AoD based positioning. To support RF sensing, a more general signaling framework for the PRS beam pattern signaling may be used. For example, in one implementation, a network node, e.g., server or transmitting node, may indicate a specific PRS frequency layer that may support RF sensing, and the PRS beam pattern information may be included in the assistance data for the PRS under that frequency layer, even if a UE based AoD based positioning session is not configured.

In another implementation, the network node, e.g., the server or transmitting node, may indicate the PRS beam pattern information for some PRS resources. For example, if the PRS support AoD based positioning, the assistance data for AoD may be reused for RF sensing. If the PRS does not support AoD based positioning, the assistance data for sensing may be configured to include the expected beam direction and expected beam direction-uncertainty.

If the sensing node is a base station, such as gNB 110, the beam pattern information for PRS resources for beam coordination for RF sensing may be provided to the base station by the network node (e.g., server or transmitter node) in appropriate messaging, which is referred to herein as assistance data.

Figure 10:
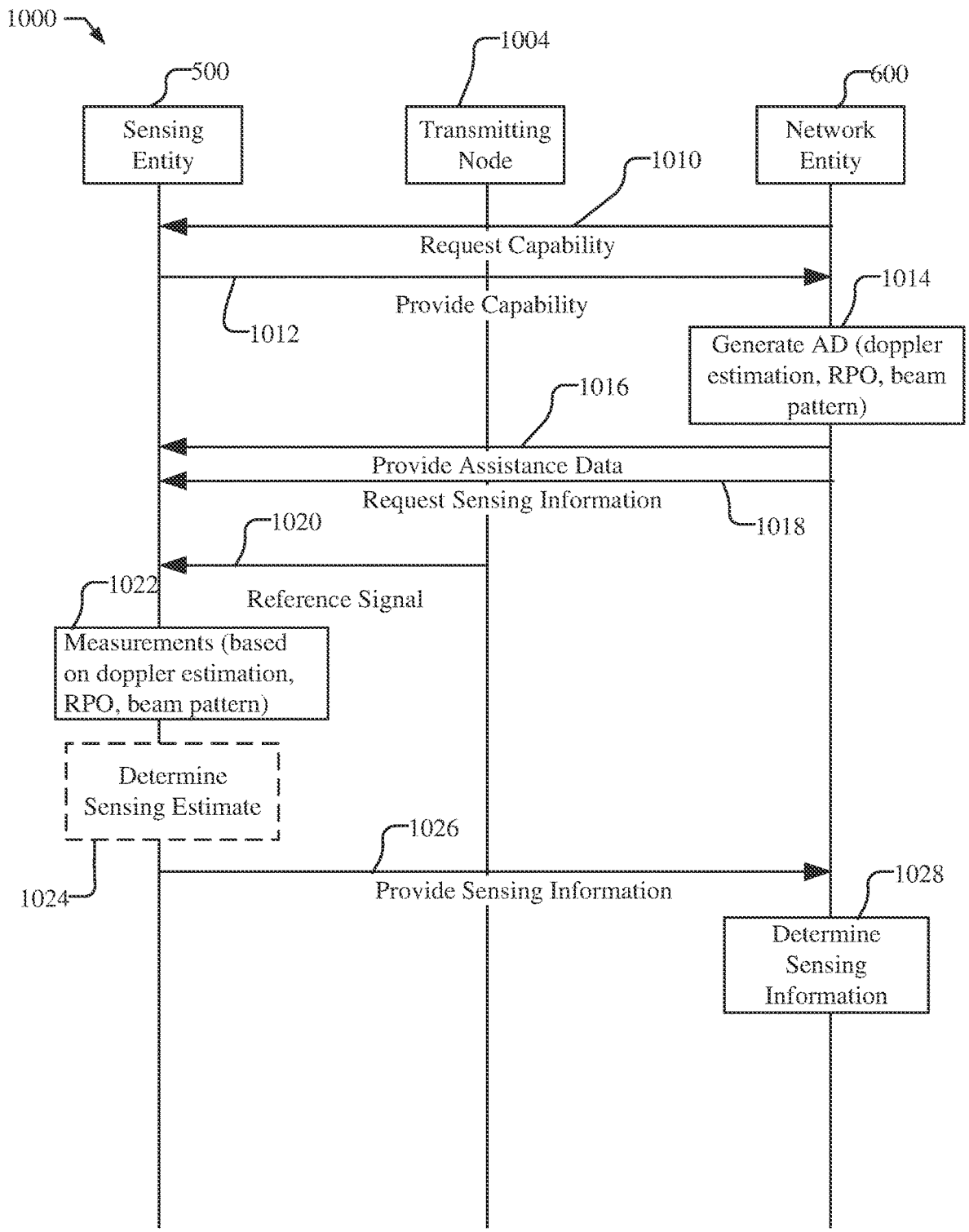
FIG. 10 illustrates a signaling and process flow illustrating the messaging including sensing assistance data message between a network entity and sensing entity for RF sensing.

FIG. 10 shows a signaling and process flow 1000 that illustrates various messages that may be sent between components of a wireless communication system, such as wireless communication system 100 depicted in FIG. 1, in a RF sensing session that includes providing assistance data supporting the RF sensing, as discussed herein. The flow 1000 is an example and other flows are possible, e.g., with one or more stages shown omitted, one or more stages added, and/or one or more stages shown altered. The sensing entity 500 in flow 1000 may be a UE or base station, and the network entity 600 may be a sensing server, e.g., server 150 shown in FIG. 1, which may be located in or external to the 5GC 140. The transmitting entity 1004 may be a base station or in some implementation may be a UE. The transmitting entity 1004 is illustrated as separate from the network entity 600 but in some implementations may be the network entity 600. The signaling and process flow 1000 may be similar to a signaling and process flow for location services supported by a NG-RAN.

As illustrated, a Request Capability message 1010 may be sent by the network entity 600 (e.g., by the sensing procedure unit 650 via the transceiver 620 shown in FIG. 6) to the sensing entity 500 (e.g., via the transceiver 520 to the sensing procedure unit 550 shown in FIG. 5), e.g., to request the sensing capabilities from the sensing entity 500.

A Provide Capabilities message 1012 to the network entity 600 may be returned the sensing entity 500 (e.g., by the sensing procedure unit 550 via the transceiver 520) to the network entity 600 (e.g., via the transceiver 620 to the sensing procedure unit 650) to provide the capabilities of the sensing entity 500. The sensing entity 500, for example, may indicate its capabilities to perform RF sensing measurements. In some implementations, the Provide Capabilities message 1012 may include information that may be used to generate sensing assistance data specifically for the sensing entity 500, such as a current location of the sensing entity 500.

At stage 1014, the network entity 600 (e.g., the sensing assistance data unit 660) may generate sensing assistance data. The sensing assistance data may be general assistance data, which may be broadcast or groupcast to multiple sensing entities (not shown), or may be specifically generated for the network entity 600, e.g., for example, the sensing assistance data may be generated based at least partially on the capabilities of the sensing entity 500. The sensing assistance data may include information for sensing unit based RF sensing, e.g., information that will enable the sensing entity 500 to generate desired estimates. For example, the sensing assistance data may include the position of one or more transmitters, with which the sensing entity 500 can determine a position of a target via multilateration.

As discussed above, network entity 600 may generate sensing assistance data that includes information for supporting Doppler estimation, such as an indication of phase coherency of PRS that may be based on any combination of frequency layer, TRP, PRS resource set, and PRS resource. The sensing assistance data may include an indication of PRS in a frequency layer that do not support Doppler estimation. The information for supporting Doppler estimation may additionally or alternatively include an indication of reference signals associated with PRS, which may be, e.g., QCL signals, and may be TRS or non-NR signals such as radar waveform. The reference signals may be close to the PRS in the time domain. The sensing assistance data, for example, may include a waveform time and parameters for the radar waveform. An expected Doppler and expected Doppler uncertainty may be generated by the network entity 600 to reduce the search window for the Doppler estimation. The expected Doppler and the expected Doppler uncertainty, for example, may be defined in multiple sets for each PRS resource or each PRS resource set. For example, a path index may be generated, which may include the channel impulse response tap index relative to a first arrival path or based on Cx1/Cx2 sampling to be used for Doppler estimation.

As discussed above in reference to FIG. 8, the network entity 600 (e.g., the sensing assistance data unit 660) may additionally or alternatively generate sensing assistance data that associates one or more reference signal resources, e.g., such as PRS resources, with one or more RPOs. For example, each PRS resource may be associated with multiple RPOs, and each RPO may be associated with multiple PRS resources. The network entity 600, for example, may fuse sensing measurement reports and 3D maps to extract RPOs that are associated with PRS resources. The RPOs associated with PRS resources may be based on the location of the sensing entity 500, which may be obtained by the network entity 600 from the sensing node, e.g., in a previous positioning session or in a message from the sensing entity 500 such as the provide capabilities message 1012, or may be obtained from a database if the sensing entity 500 is a stationary node, such as a base station or RSU. The RPOs associated with the PRS resources may include IDs and locations. For example, each PRS resource may be associated with a list of RPOs that includes an identifier and a location for each RPO in the list. The RPOs associated with the PRS resources may be associated with features such as class, RCS, material, size, shape, or any combination thereof.

As discussed above in reference to FIG. 9, the network entity 600 (e.g., the sensing assistance data unit 660) may additionally or alternatively generate sensing assistance data that includes beam pattern information for PRS that may be used for beam coordination for RF sensing. For example, the network entity 600 may indicate a PRS frequency layer that supports RF sensing and may provide the PRS beam pattern information may be included under that frequency layer, even if a UE based AoD based positioning session is not configured. The network entity 600 may reuse assistance data for AoD if the PRS supports AoD based positioning, or if the AoD does not support AoD based positioning, the network entity 600 may identify expected beam direction and expected beam direction uncertainty for the PRS beam pattern information.

A Provide Assistance Data message 1016 is sent by the network entity (e.g., by the sensing procedure unit 650 via the transceiver 620) to the sensing entity 500 (e.g., via the transceiver 520 to the sensing procedure unit 550) to provide the sensing assistance data generated in stage 1014. The sensing assistance data is received by the sensing entity 500 and may be processed by the sensing entity 500 (e.g., the sensing assistance data unit 560) to assist in acquisition and measurement of reference signals for RF sensing.

A Request Sensing Information message 1018 is sent by the network entity (e.g., by the sensing procedure unit 650 via the transceiver 620) to the sensing entity 500 (e.g., via the transceiver 520 to the sensing procedure unit 550) to request measurement of reference signal transmissions for RF sensing. The network entity 600 may also indicate whether sensing node based RF sensing is requested, whereby the sensing entity 500 determines sensing measurements, or sensing node assisted RF sensing is requested whereby the sensing entity 500 measures the reference signals and sends the measurements to the network entity 600 to determine the sensing measurements.

Reference signals 1020 are transmitted by the transmitting entity 1004 (e.g., via transceiver 340 shown in FIG. 3). The reference signals may be reflected by a target (and may be reflected by one or more RPOs). The reference signals are received by the sensing entity 500 (e.g., via the transceiver 520 to the sensing measurement unit 570). The reference signals, for example, may be PRS. In some implementations other reference signals may be additionally used or may be alternatively used. The reference signals, e.g., PRS resources, PRS resource set, TRP, and/or frequency layer, may have phase coherence for Doppler estimation. The reflected reference signals received by the sensing entity 500 may also be reflected by one or more RPOs. Further, the reference signals may be transmitted a beam pattern as provided in the assistance data.

At stage 1022, the sensing entity 500 (e.g., the sensing measurement unit 570) may process and measure the received reference signals for RF sensing. The sensing measurements may be performed with the received reference signals that were reflected from the target based on the sensing assistance data received from the network entity 600 in message 1016. For example, as discussed above, the sensing entity 500 may perform Doppler estimation using phase coherent PRS resources, resource set, TRP or frequency layer and/or associated reference signals identified in the sensing assistance data. The Doppler estimation may be based on an exclusion of the PRS that do not support Doppler estimation, as indicated in the sensing assistance data. The expected Doppler and expected Doppler uncertainty provided in the sensing assistance data may be used by the sensing entity 500 to reduce the search window for the Doppler estimation. For example, a path index, which may include the channel impulse response tap index relative to a first arrival path or based on Cx1/Cx2 sampling may be used by the sensing entity 500 for Doppler estimation.

As discussed above in reference to FIG. 8, where RPOs are present, the sensing measurements performed by the sensing entity 500 may be based on the received reference signals and the association of the reference signals and the RPOs received in the sensing assistance data in message 1016. For example, the sensing entity 500 (e.g., the sensing measurement unit 570) may exclude reference signals, e.g., PRS resource that is associated with an RPO, from the reference signals used for the sensing measurements.

As discussed above in reference to FIG. 9, where beam pattern information is provided in the sensing assistance data message 1016, the sensing entity 500 (e.g., the sensing measurement unit 570) may perform sensing measurements based on the received reference signals and the beam pattern information received in the assistance data for beam coordination. For example, the sensing entity 500 may identify beams that are not reflected from the target, or identify beams that are likely reflected from the target based on the beam pattern information, and may perform sensing measurements based on the beams accordingly.

At stage 1024, the sensing entity 500 (e.g., the sensing estimate unit 580) may optionally determine sensing estimate(s) based on the sensing measurements performed in stage 1022. For example, the sensing entity 500 may determine the range or position of the target with respect to the sensing entity 500, the speed of the target and/or direction of travel based on the reference signal measurements. The sensing entity 500, for example, may determine the position of a target based on ranges to a plurality (e.g., three or more) of transmitters and position information for the transmitters using multilateration.

A Provide Sensing Information message 1026 is sent by the sensing entity 500 (e.g., by the sensing procedure unit 550 via the transceiver 520) to the network entity 600 (e.g., via the transceiver 620 to the sensing procedure unit 650) to provide sensing information, such as the reference signal measurements obtained at stage 1022 and/or the sensing estimate(s) obtained at stage 1024.

At stage 1028, the network entity 600 (e.g., the sensing measurement unit 670 and sensing estimate unit 680) may determine sensing information, such as sensing estimate(s) for the target based on the sensing measurements or estimate information provided by the sensing entity 500 in the Provide Sensing Information message 1026.

Figure 11:
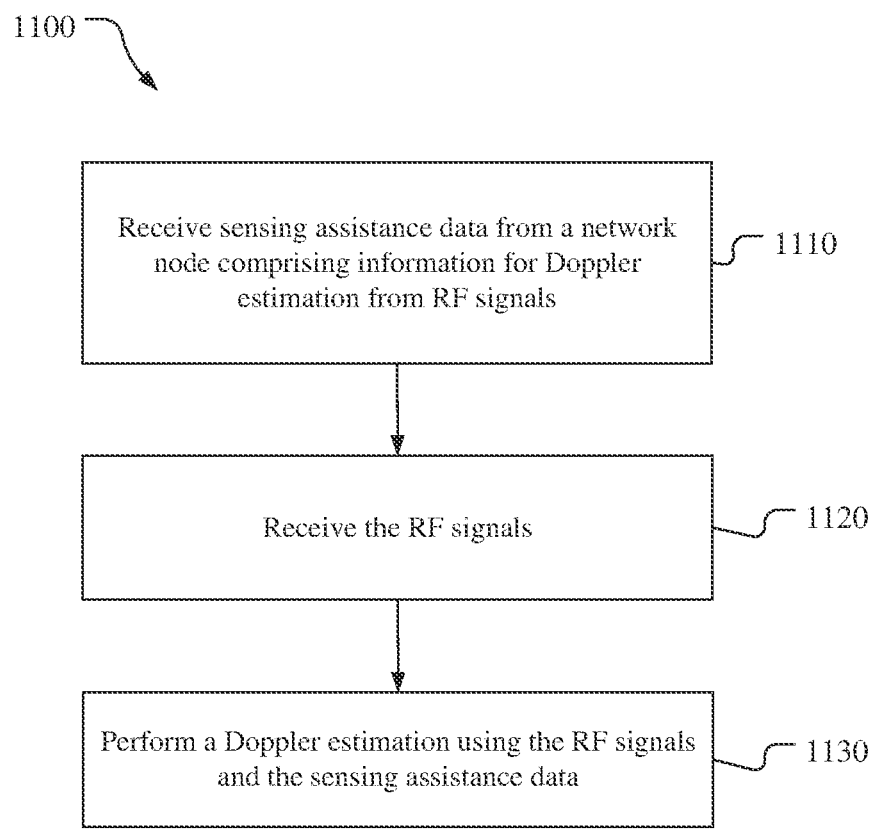
FIG. 11 illustrates a flowchart for an exemplary process for supporting RF sensing in a wireless network using sensing assistance data that includes information for Doppler estimation.

FIG. 11 shows a flowchart for an exemplary process 1100 for supporting radio frequency (RF) sensing in a wireless network, which may be performed by a sensing node, such as sensing entity 500 illustrated in FIGS. 5 and 10, which may be, e.g., the UE 105 shown in FIG. 1 or a base station 110 shown in FIG. 1, and in a manner consistent with disclosed implementations.

At block 1110, the sensing node receives sensing assistance data from a network node, such as network entity 600 illustrated in FIGS. 6 and 10, which may be, e.g., a sensing server 150 shown in FIG. 1 or a base station 110 shown in FIG. 1, comprising information for Doppler estimation from RF signals, e.g., as discussed in stage 1014 and message 1016 of FIG. 10. The processor 510 configured to perform functions of the sensing assistance data unit 560 by dedicated hardware or implementing executable code or software instructions in memory 530, in combination with the transceiver 520 (e.g., the wireless receiver 244 and the antenna 246 or receiver 254 of UE 200 in FIG. 2 or the wireless receiver 344 and the antenna 346 or receiver 354 of TRP 300 in FIG. 3) may comprise a means for receiving sensing assistance data from a network node comprising information for Doppler estimation from RF signals.

At block 1120, the sensing node receives the RF signals, e.g., as illustrated by reference signals 1020 of FIG. 10. The processor 510 configured to perform functions of the sensing measurement unit 570 by dedicated hardware or implementing executable code or software instructions in memory 530, in combination with the transceiver 520 (e.g., the wireless receiver 244 and the antenna 246 of UE 200 in FIG. 2 or the wireless receiver 344 and the antenna 346 of TRP 300 in FIG. 3) may comprise a means for receiving the RF signals.

At block 1130, the sensing node performs a Doppler estimation using the RF signals and the sensing assistance data, e.g., as discussed at stage 1022 of FIG. 10. The processor 510 configured to perform functions of the sensing measurement unit 570 by dedicated hardware or implementing executable code or software instructions in memory 530 may comprise a means for performing a Doppler estimation using the RF signals and the sensing assistance data.

In one implementation, the RF signals may be positioning reference signals (PRS), and wherein the information for Doppler estimation may include an indication of phase coherency of the PRS, e.g., as discussed in reference to stages 1014 and 1022 of FIG. 10. For example, the indication of phase coherency of the PRS may be an indication of at least one group of PRS with phase coherency, and performing the Doppler estimation may be based on the at least one group of PRS with phase coherency, e.g., as discussed in reference to stages 1014 and 1022 of FIG. 10. The indication of phase coherency of the PRS may include an indication of at least one transmission reception point (TRP) that supports transmission of PRS with phase coherency, and performing the Doppler estimation may be based on PRS received from the at least one TRP that supports transmission of PRS with phase coherency, e.g., as discussed in reference to stages 1014 and 1022 of FIG. 10. The indication of phase coherency of the PRS may further include an indication of at least one group of PRS with phase coherency from the at least one TRP that supports transmission of PRS with phase coherency, and performing the Doppler estimation may be further based on the at least one group of PRS with phase coherency, e.g., as discussed in reference to stages 1014 and 1022 of FIG. 10. The indication of phase coherency of the PRS may include an indication of a frequency layer that supports transmission of PRS with phase coherency, and performing the Doppler estimation may be based on PRS received from the frequency layer that supports transmission of PRS with phase coherency, e.g., as discussed in reference to stages 1014 and 1022 of FIG. 10. The indication of phase coherency of the PRS may further include an indication of the PRS in the frequency layer that do not support Doppler estimation, performing the Doppler estimation may be based on an exclusion of the PRS that do not support Doppler estimation, e.g., as discussed in reference to stages 1014 and 1022 of FIG. 10. In one implementation, the indication of phase coherency of the PRS may include an indication of any combination of frequency layer, transmission reception point (TRP), PRS resource set, and PRS resource that supports phase coherency, e.g., as discussed in reference to stages 1014 and 1022 of FIG. 10.

In one implementation, the information for Doppler estimation may include an indication of positioning reference signals (PRS) and reference signals that are associated for Doppler estimation, e.g., as discussed in reference to stages 1014 and 1022 of FIG. 10. The PRS and the reference signals that are associated for Doppler estimation, for example, may be Quasi-Colocation (QCL) signals, e.g., as discussed in reference to stages 1014 and 1022 of FIG. 10. The reference signals may be configured close to the PRS in time domain, e.g., as discussed in reference to stages 1014 and 1022 of FIG. 10. The reference signals, for example, may include at least one of tracking reference signals (TRS) or a radar waveform, e.g., as discussed in reference to stages 1014 and 1022 of FIG. 10. The sensing assistance data may further include a waveform type and parameters for the radar waveform, e.g., as discussed in reference to stages 1014 and 1022 of FIG. 10.

In one implementation, the information for Doppler estimation may include information for a search window for the Doppler estimation comprising an expected Doppler and an expected Doppler uncertainty, e.g., as discussed in reference to stages 1014 and 1022 of FIG. 10. The RF signals, for example, may include positioning reference signals (PRS), and the expected Doppler and the expected Doppler uncertainty may be defined in multiple sets for each PRS resource or each PRS resource set, e.g., as discussed in reference to stages 1014 and 1022 of FIG. 10. The sensing assistance data may be specific to the sensing node, and each set of the expected Doppler and the expected Doppler uncertainty may be associated with a path index, wherein the path index is a channel impulse response tap index relative to a first arrival path or is based on Cx1/Cx2 sampling, e.g., as discussed in reference to stages 1014 and 1022 of FIG. 10.

Figure 12:
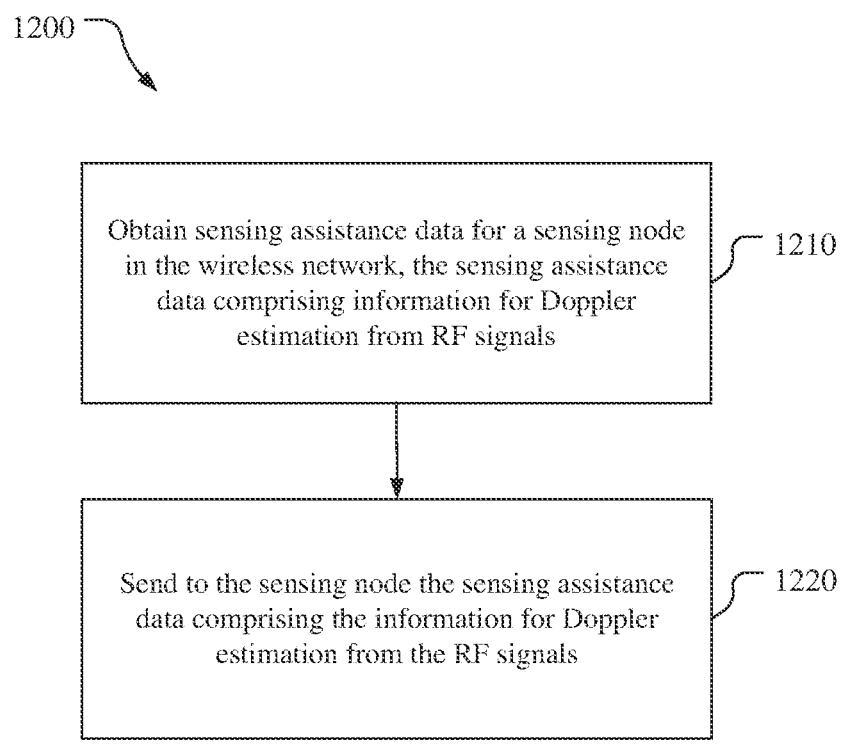
FIG. 12 illustrates a flowchart for an exemplary process for supporting RF sensing in a wireless network using sensing assistance data that includes information for Doppler estimation.

FIG. 12 shows a flowchart for an exemplary process 1200 for supporting radio frequency (RF) sensing in a wireless network, which may be performed by a network node, such as network entity 600 illustrated in FIGS. 6 and 10, which may be, e.g., a sensing server 150 shown in FIG. 1 or a base station 110 shown in FIG. 1, and in a manner consistent with disclosed implementations.

At block 1210, the network node obtains sensing assistance data for a sensing node in the wireless network, the sensing assistance data comprising information for Doppler estimation from RF signals, e.g., as discussed in stage 1014 of FIG. 10. The processor 610 configured to perform functions of the sensing assistance data unit 660 by dedicated hardware or implementing executable code or software instructions in memory 630 may comprise a means for obtaining sensing assistance data for a sensing node in the wireless network, the sensing assistance data comprising information for Doppler estimation from RF signals.

At block 1220, the network node sends to the sensing node, such as sensing entity 500 illustrated in FIGS. 5 and 10, which may be, e.g., the UE 105 shown in FIG. 1 or a base station 110 shown in FIG. 1, the sensing assistance data including the information for Doppler estimation from the RF signals, e.g., as discussed in message 1016 of FIG. 10. The processor 610 configured to perform functions of the sensing assistance data unit 660 by dedicated hardware or implementing executable code or software instructions in memory 630, in combination with the transceiver 620 (e.g., the transmitter 442 and the antenna 446 or transmitter 452 of server 400 in FIG. 4 or the transmitter 342 and the antenna 346 or transmitter 352 of TRP 300 in FIG. 3) may comprise a means for sending to the sensing node the sensing assistance data comprising the information for Doppler estimation from the RF signals.

In one implementation, the network node may receive a sensing report from the sensing node, e.g., as discussed in message 1026 of FIG. 10. The processor 610 configured to perform functions of the sensing assistance data unit 660 by dedicated hardware or implementing executable code or software instructions in memory 630, in combination with the transceiver 620 (e.g., the receiver 444 and the antenna 446 or receiver 454 of server 400 in FIG. 4 or the transmitter 344 and the antenna 346 or transmitter 354 of TRP 300 in FIG. 3) may comprise a means for receiving a sensing report from the sensing node.

In one implementation, the RF signals may be positioning reference signals (PRS), and wherein the information for Doppler estimation may include an indication of phase coherency of the PRS, e.g., as discussed in reference to stages 1014 and 1022 of FIG. 10. For example, the indication of phase coherency of the PRS may be an indication of at least one group of PRS with phase coherency, and performing the Doppler estimation may be based on the at least one group of PRS with phase coherency, e.g., as discussed in reference to stages 1014 and 1022 of FIG. 10. The indication of phase coherency of the PRS may include an indication of at least one transmission reception point (TRP) that supports transmission of PRS with phase coherency, and performing the Doppler estimation may be based on PRS received from the at least one TRP that supports transmission of PRS with phase coherency, e.g., as discussed in reference to stages 1014 and 1022 of FIG. 10. The indication of phase coherency of the PRS may further include an indication of at least one group of PRS with phase coherency from the at least one TRP that supports transmission of PRS with phase coherency, and performing the Doppler estimation may be further based on the at least one group of PRS with phase coherency, e.g., as discussed in reference to stages 1014 and 1022 of FIG. 10. The indication of phase coherency of the PRS may include an indication of a frequency layer that supports transmission of PRS with phase coherency, and performing the Doppler estimation may be based on PRS received from the frequency layer that supports transmission of PRS with phase coherency, e.g., as discussed in reference to stages 1014 and 1022 of FIG. 10. The indication of phase coherency of the PRS may further include an indication of the PRS in the frequency layer that do not support Doppler estimation, performing the Doppler estimation may be based on an exclusion of the PRS that do not support Doppler estimation, e.g., as discussed in reference to stages 1014 and 1022 of FIG. 10. In one implementation, the indication of phase coherency of the PRS may include an indication of any combination of frequency layer, transmission reception point (TRP), PRS resource set, and PRS resource that supports phase coherency, e.g., as discussed in reference to stages 1014 and 1022 of FIG. 10.

In one implementation, the information for Doppler estimation may include an indication of positioning reference signals (PRS) and reference signals that are associated for Doppler estimation, e.g., as discussed in reference to stages 1014 and 1022 of FIG. 10. The PRS and the reference signals that are associated for Doppler estimation, for example, may be Quasi-Colocation (QCL) signals, e.g., as discussed in reference to stages 1014 and 1022 of FIG. 10. The reference signals may be configured close to the PRS in time domain, e.g., as discussed in reference to stages 1014 and 1022 of FIG. 10. The reference signals, for example, may include at least one of tracking reference signals (TRS) or a radar waveform, e.g., as discussed in reference to stages 1014 and 1022 of FIG. 10. The sensing assistance data may further include a waveform type and parameters for the radar waveform, e.g., as discussed in reference to stages 1014 and 1022 of FIG. 10.

In one implementation, the information for Doppler estimation may include information for a search window for the Doppler estimation comprising an expected Doppler and an expected Doppler uncertainty, e.g., as discussed in reference to stages 1014 and 1022 of FIG. 10. The RF signals, for example, may include positioning reference signals (PRS), and the expected Doppler and the expected Doppler uncertainty may be defined in multiple sets for each PRS resource or each PRS resource set, e.g., as discussed in reference to stages 1014 and 1022 of FIG. 10. The sensing assistance data may be specific to the sensing node, and each set of the expected Doppler and the expected Doppler uncertainty may be associated with a path index, wherein the path index is a channel impulse response tap index relative to a first arrival path or is based on Cx1/Cx2 sampling, e.g., as discussed in reference to stages 1014 and 1022 of FIG. 10.

Figure 13:
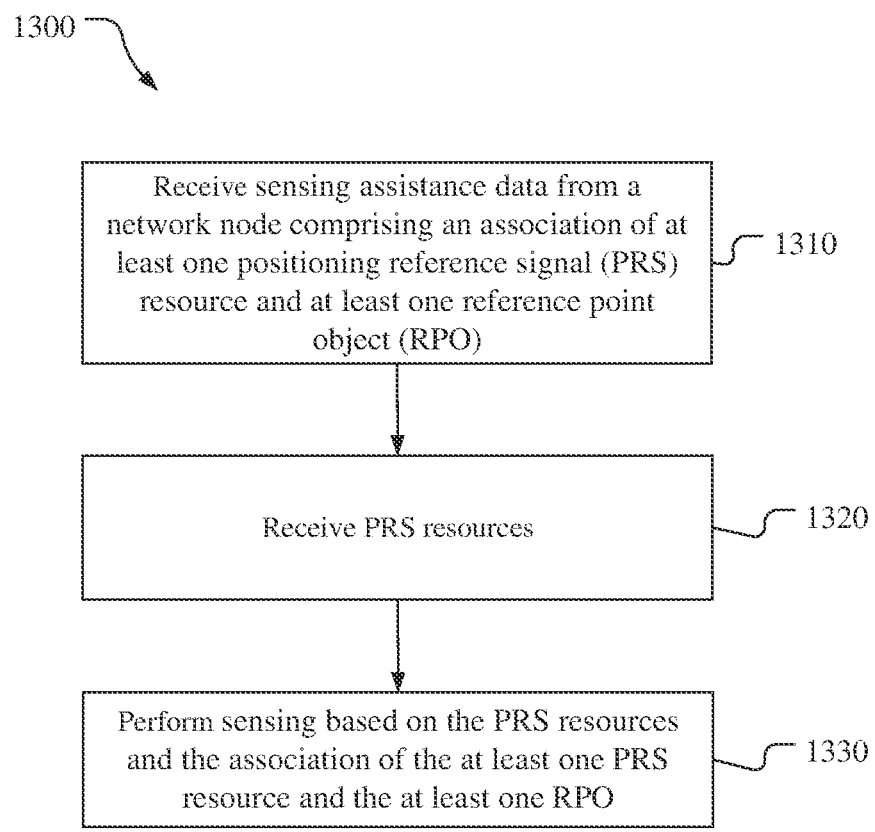
FIG. 13 illustrates a flowchart for an exemplary process for supporting RF sensing in a wireless network using sensing assistance data that includes information for an RPO.

FIG. 13 shows a flowchart for an exemplary process 1300 for supporting radio frequency (RF) sensing in a wireless network, which may be performed by a sensing node, such as sensing entity 500 illustrated in FIGS. 5 and 10, which may be, e.g., the UE 105 shown in FIG. 1 or a base station 110 shown in FIG. 1, and in a manner consistent with disclosed implementations.

At block 1310, the sensing node receives sensing assistance data from a network node, such as network entity 600 illustrated in FIGS. 6 and 10, which may be, e.g., a sensing server 150 shown in FIG. 1, or a base station 110 shown in FIG. 1, comprising an association of at least one positioning reference signal (PRS) resource and at least one reference point object (RPO), e.g., as discussed in stage 1014 and message 1016 of FIG. 10 and in reference to FIG. 8. The processor 510 configured to perform functions of the sensing assistance data unit 560 by dedicated hardware or implementing executable code or software instructions in memory 530, in combination with the transceiver 520 (e.g., the wireless receiver 244 and the antenna 246 or receiver 254 of UE 200 in FIG. 2 or the wireless receiver 344 and the antenna 346 or receiver 354 of TRP 300 in FIG. 3) may comprise a means for receiving sensing assistance data from a network node comprising an association of at least one positioning reference signal (PRS) resource and at least one reference point object (RPO).

At block 1320, the sensing node receives PRS resources, e.g., as illustrated by reference signals 1020 of FIG. 10. The processor 510 configured to perform functions of the sensing measurement unit 570 by dedicated hardware or implementing executable code or software instructions in memory 530, in combination with the transceiver 520 (e.g., the wireless receiver 244 and the antenna 246 of UE 200 in FIG. 2 or the wireless receiver 344 and the antenna 346 of TRP 300 in FIG. 3) may comprise a means for receiving PRS resources.

At block 1330, the sensing node performs sensing based on the PRS resources and the association of the at least one PRS resource and the at least one RPO, e.g., as discussed at stage 1022 of FIG. 10 and in reference to FIG. 8. The processor 510 configured to perform functions of the sensing measurement unit 570 by dedicated hardware or implementing executable code or software instructions in memory 530 may comprise a means for performing sensing based on the PRS resources and the association of the at least one PRS resource and the at least one RPO.

In one implementation, the sensing node performs sensing based on the PRS resources and the association of the at least one PRS resource and the at least one RPO by excluding the at least one PRS resource that is associated from the at least one RPO from the PRS resources used for performing sensing, e.g., as discussed at stage 1022 of FIG. 10 and in reference to FIG. 8. The processor 510 configured to perform functions of the sensing measurement unit 570 by dedicated hardware or implementing executable code or software instructions in memory 530 may comprise a means for excluding the at least one PRS resource that is associated from the at least one RPO from the PRS resources used for performing sensing.

In one implementation, the sensing assistance data may include an identifier and a location of each of the at least one RPO, e.g., as discussed at stage 1014 of FIG. 10 and in reference to FIG. 8.

In one implementation, the sensing assistance data may include for each of the at least one PRS resource a list of RPOs comprising an identifier and a location for each RPO in the list of RPOs, e.g., as discussed at stage 1014 of FIG. 10 and in reference to FIG. 8.

In one implementation, for each of the at least one RPO, the sensing assistance data comprises at least one of a class, a radar cross section, a material, a size, a shape, or any combination thereof, e.g., as discussed at stage 1014 of FIG. 10 and in reference to FIG. 8.

In one implementation, the at least one PRS resource may be associated with multiple RPOs, and the at least one RPO may be associated with multiple PRS resources, e.g., as discussed at stage 1014 of FIG. 10 and in reference to FIG. 8.

Figure 14:
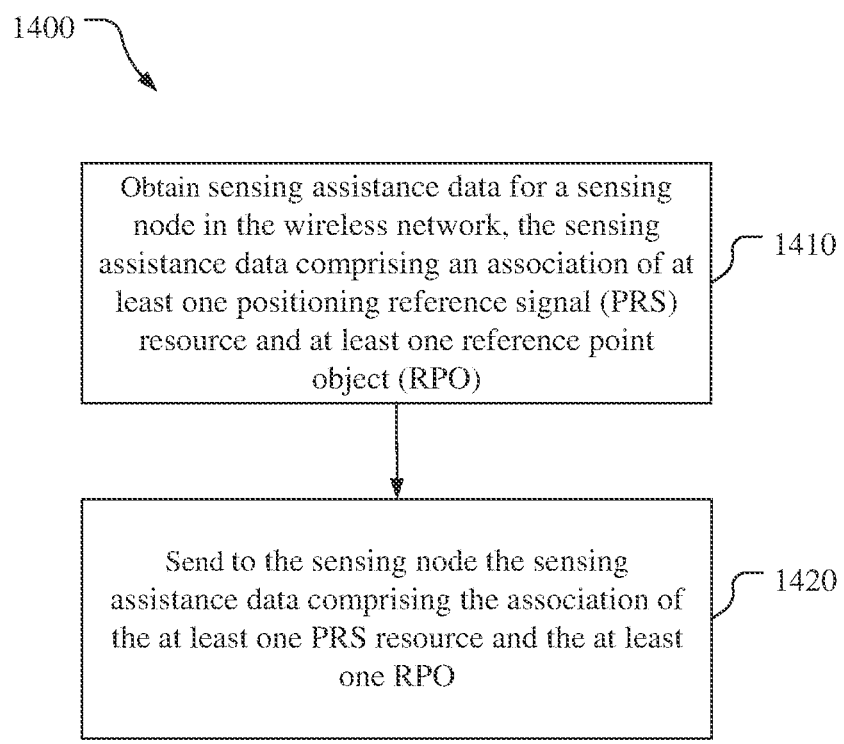
FIG. 14 illustrates a flowchart for an exemplary process for supporting RF sensing in a wireless network using sensing assistance data that includes information for an RPO.

FIG. 14 shows a flowchart for an exemplary process 1400 for supporting radio frequency (RF) sensing in a wireless network, which may be performed by a network node, such as network entity 600 illustrated in FIGS. 6 and 10, which may be, e.g., a sensing server 150 shown in FIG. 1 or a base station 110 shown in FIG. 1, and in a manner consistent with disclosed implementations.

At block 1410, the network node obtains sensing assistance data for a sensing node in the wireless network, the sensing assistance data comprising an association of at least one positioning reference signal (PRS) resource and at least one reference point object (RPO), e.g., as discussed in stage 1014 of FIG. 10 and in reference to FIG. 8. The processor 610 configured to perform functions of the sensing assistance data unit 660 by dedicated hardware or implementing executable code or software instructions in memory 630 may comprise a means for obtaining sensing assistance data for a sensing node in the wireless network, the sensing assistance data comprising an association of at least one positioning reference signal (PRS) resource and at least one reference point object (RPO).

At block 1420, the network node sends to the sensing node, such as sensing entity 500 illustrated in FIGS. 5 and 10, which may be, e.g., the UE 105 shown in FIG. 1 or a base station 110 shown in FIG. 1, the sensing assistance data comprising the association of the at least one PRS resource and the at least one RPO, e.g., as discussed in message 1016 of FIG. 10 and in reference to FIG. 8. The processor 610 configured to perform functions of the sensing assistance data unit 660 by dedicated hardware or implementing executable code or software instructions in memory 630, in combination with the transceiver 620 (e.g., the transmitter 442 and the antenna 446 or transmitter 452 of server 400 in FIG. 4 or the transmitter 342 and the antenna 346 or transmitter 352 of TRP 300 in FIG. 3) may comprise a means for sending to the sensing node the sensing assistance data comprising the association of the at least one PRS resource and the at least one RPO.

In one implementation, the at least one RPO is determined based on a three dimensional map and one or more sensing measurement reports received from one or more sensing nodes, e.g., as discussed in stage 1014 of FIG. 10 and in reference to FIG. 8.

In one implementation, the sensing assistance data may include an identifier and a location of each of the at least one RPO, e.g., as discussed at stage 1014 of FIG. 10 and in reference to FIG. 8.

In one implementation, the sensing assistance data may include for each of the at least one PRS resource a list of RPOs comprising an identifier and a location for each RPO in the list of RPOs, e.g., as discussed at stage 1014 of FIG. 10 and in reference to FIG. 8.

In one implementation, for each of the at least one RPO, the sensing assistance data comprises at least one of a class, a radar cross section, a material, a size, a shape, or any combination thereof, e.g., as discussed at stage 1014 of FIG. 10 and in reference to FIG. 8.

In one implementation, the at least one PRS resource may be associated with multiple RPOs, and the at least one RPO may be associated with multiple PRS resources, e.g., as discussed at stage 1014 of FIG. 10 and in reference to FIG. 8.

Figure 15:
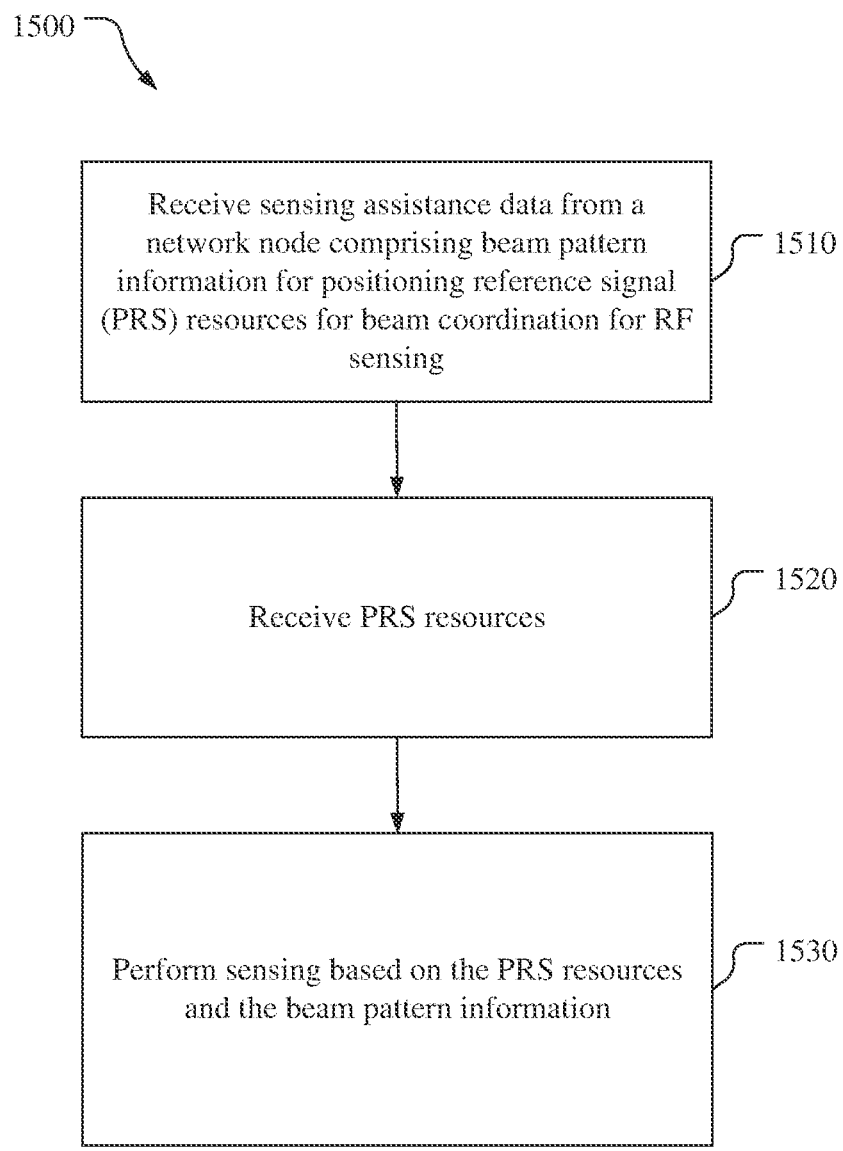
FIG. 15 illustrates a flowchart for an exemplary process for supporting RF sensing in a wireless network using sensing assistance data that includes beam pattern information for sensing reference signals.

FIG. 15 shows a flowchart for an exemplary process 1500 for supporting radio frequency (RF) sensing in a wireless network, which may be performed by a sensing node, such as sensing entity 500 illustrated in FIGS. 5 and 10, which may be, e.g., the UE 105 shown in FIG. 1 or a base station 110 shown in FIG. 1, and in a manner consistent with disclosed implementations.

At block 1510, the sensing node receives sensing assistance data from a network node, such as network entity 600 illustrated in FIGS. 6 and 10, which may be, e.g., a sensing server 150 shown in FIG. 1 or a base station 110 shown in FIG. 1, comprising beam pattern information for positioning reference signal (PRS) resources for beam coordination for RF sensing, e.g., as discussed in stage 1014 and message 1016 of FIG. 10 and in reference to FIG. 9. The processor 510 configured to perform functions of the sensing assistance data unit 560 by dedicated hardware or implementing executable code or software instructions in memory 530, in combination with the transceiver 520 (e.g., the wireless receiver 244 and the antenna 246 or receiver 254 of UE 200 in FIG. 2 or the wireless receiver 344 and the antenna 346 or receiver 354 of TRP 300 in FIG. 3) may comprise a means for receiving sensing assistance data from a network node comprising beam pattern information for positioning reference signal (PRS) resources for beam coordination for RF sensing.

At block 1520, the sensing node receives PRS resources, e.g., as illustrated by reference signals 1020 of FIG. 10. The processor 510 configured to perform functions of the sensing measurement unit 570 by dedicated hardware or implementing executable code or software instructions in memory 530, in combination with the transceiver 520 (e.g., the wireless receiver 244 and the antenna 246 of UE 200 in FIG. 2 or the wireless receiver 344 and the antenna 346 of TRP 300 in FIG. 3) may comprise a means for receiving PRS resources.

At block 1530, the sensing node performs sensing based on the PRS resources and the beam pattern information, e.g., as discussed at stage 1022 of FIG. 10 and in reference to FIG. 9. The processor 510 configured to perform functions of the sensing measurement unit 570 by dedicated hardware or implementing executable code or software instructions in memory 530 may comprise a means for performing sensing based on the PRS resources and the beam pattern information.

In one implementation, the sensing assistance data may further include an indication of a frequency layer that supports RF sensing, and the beam pattern information for the PRS resources for beam coordination for RF sensing is for PRS resources in the frequency layer, e.g., as discussed in stage 1014 and message 1016 of FIG. 10 and in reference to FIG. 9. For example, an Angle of Departure (AoD) based positioning sessions may not be configured for the sensing node, e.g., as discussed in stage 1014 and message 1016 of FIG. 10 and in reference to FIG. 9.

In one implementation, PRS resources support Angle of Departure (AoD) based positioning, and the beam pattern information for the PRS resources for beam coordination for RF sensing may include assistance data for the AoD based positioning, e.g., as discussed in stage 1014 and message 1016 of FIG. 10 and in reference to FIG. 9.

In one implementation, the beam pattern information for the PRS resources for beam coordination for RF sensing may include an expected beam direction and an expected beam direction uncertainty, e.g., as discussed in stage 1014 and message 1016 of FIG. 10 and in reference to FIG. 9.

Figure 16:
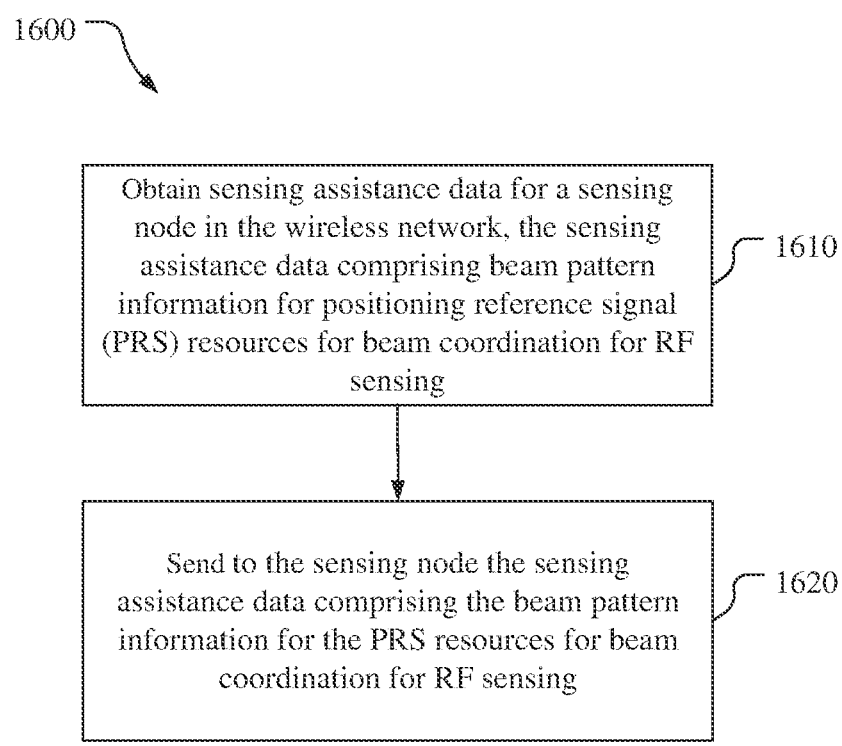
FIG. 16 illustrates a flowchart for an exemplary process for supporting RF sensing in a wireless network using sensing assistance data that includes beam pattern information for sensing reference signals.

FIG. 16 shows a flowchart for an exemplary process 1600 for supporting radio frequency (RF) sensing in a wireless network, which may be performed by a network node, such as network entity 600 illustrated in FIGS. 6 and 10, which may be, e.g., a sensing server 150 shown in FIG. 1 or a base station 110 shown in FIG. 1, and in a manner consistent with disclosed implementations.

At block 1610, the network node obtains sensing assistance data for a sensing node in the wireless network, the sensing assistance data comprising beam pattern information for positioning reference signal (PRS) resources for beam coordination for RF sensing, e.g., as discussed in stage 1014 of FIG. 10 and in reference to FIG. 8. The processor 610 configured to perform functions of the sensing assistance data unit 660 by dedicated hardware or implementing executable code or software instructions in memory 630 may comprise a means for obtaining sensing assistance data for a sensing node in the wireless network, the sensing assistance data comprising an association of at least one positioning reference signal (PRS) resource and at least one reference point object (RPO).

At block 1620, the network node sends to the sensing node, such as sensing entity 500 illustrated in FIGS. 5 and 10, which may be, e.g., the UE 105 shown in FIG. 1 or a base station 110 shown in FIG. 1, to the sensing node the sensing assistance data comprising the beam pattern information for the PRS resources for beam coordination for RF sensing, e.g., as discussed in message 1016 of FIG. 10 and in reference to FIG. 8. The processor 610 configured to perform functions of the sensing assistance data unit 660 by dedicated hardware or implementing executable code or software instructions in memory 630, in combination with the transceiver 620 (e.g., the transmitter 442 and the antenna 446 or transmitter 452 of server 400 in FIG. 4 or the transmitter 342 and the antenna 346 or transmitter 352 of TRP 300 in FIG. 3) may comprise a means for sending to the sensing node the sensing assistance data comprising the association of the at least one PRS resource and the at least one RPO.

In one implementation, the sensing assistance data may further include an indication of a frequency layer that supports RF sensing, and the beam pattern information for the PRS resources for beam coordination for RF sensing is for PRS resources in the frequency layer, e.g., as discussed in stage 1014 and message 1016 of FIG. 10 and in reference to FIG. 9. For example, an Angle of Departure (AoD) based positioning sessions may not be configured for the sensing node, e.g., as discussed in stage 1014 and message 1016 of FIG. 10 and in reference to FIG. 9.

In one implementation, PRS resources support Angle of Departure (AoD) based positioning, and the beam pattern information for the PRS resources for beam coordination for RF sensing may include assistance data for the AoD based positioning, e.g., as discussed in stage 1014 and message 1016 of FIG. 10 and in reference to FIG. 9.

In one implementation, the beam pattern information for the PRS resources for beam coordination for RF sensing may include an expected beam direction and an expected beam direction uncertainty, e.g., as discussed in stage 1014 and message 1016 of FIG. 10 and in reference to FIG. 9.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a sensing node in a wireless network for supporting radio frequency (RF) sensing in the wireless network, comprising: receiving sensing assistance data from a network node comprising information for Doppler estimation from RF signals; receiving the RF signals; and performing a Doppler estimation using the RF signals and the sensing assistance data.

Clause 2. The method of clause 1, wherein the RF signals comprise positioning reference signals (PRS), and wherein the information for Doppler estimation comprises an indication of phase coherency of the PRS.

Clause 3. The method of clause 2, wherein the indication of phase coherency of the PRS comprises an indication of at least one group of PRS with phase coherency, and wherein performing the Doppler estimation is based on the at least one group of PRS with phase coherency.

Clause 4. The method of any of clauses 2-3, wherein the indication of phase coherency of the PRS comprises an indication of at least one transmission reception point (TRP) that supports transmission of PRS with phase coherency, and wherein performing the Doppler estimation is based on PRS received from the at least one TRP that supports transmission of PRS with phase coherency.

Clause 5. The method of clause 4, wherein the indication of phase coherency of the PRS further comprises an indication of at least one group of PRS with phase coherency from the at least one TRP that supports transmission of PRS with phase coherency, and wherein performing the Doppler estimation is further based on the at least one group of PRS with phase coherency.

Clause 6. The method of any of clauses 2-5, wherein the indication of phase coherency of the PRS comprises an indication of a frequency layer that supports transmission of PRS with phase coherency, and wherein performing the Doppler estimation is based on PRS received from the frequency layer that supports transmission of PRS with phase coherency.

Clause 7. The method of clause 6, wherein the indication of phase coherency of the PRS further comprises an indication of the PRS in the frequency layer that do not support Doppler estimation, wherein performing the Doppler estimation is based on an exclusion of the PRS that do not support Doppler estimation.

Clause 8. The method of any of clauses 2-7, wherein the indication of phase coherency of the PRS comprises an indication of any combination of frequency layer, transmission reception point (TRP), PRS resource set, and PRS resource that supports phase coherency.

Clause 9. The method of any of clauses 1-8, wherein the information for Doppler estimation comprises an indication of positioning reference signals (PRS) and reference signals that are associated for Doppler estimation.

Clause 10. The method of clause 9, wherein the PRS and the reference signals that are associated for Doppler estimation are Quasi-Colocation (QCL) signals.

Clause 11. The method of any of clauses 9-10, wherein the reference signals are configured close to the PRS in time domain.

Clause 12. The method of any of clauses 9-11, wherein the reference signals comprise at least one of tracking reference signals (TRS) or a radar waveform.

Clause 13. The method of clause 12, wherein sensing assistance data further comprises a waveform type and parameters for the radar waveform.

Clause 14. The method of any of clauses 1-13, wherein the information for Doppler estimation comprises information for a search window for the Doppler estimation comprising an expected Doppler and an expected Doppler uncertainty.

Clause 15. The method of clause 14, wherein the RF signals comprise positioning reference signals (PRS), and wherein the expected Doppler and the expected Doppler uncertainty are defined in multiple sets for each PRS resource or each PRS resource set.

Clause 16. The method of any of clauses 14-15, wherein sensing assistance data is specific to the sensing node, and each set of the expected Doppler and the expected Doppler uncertainty is associated with a path index, wherein the path index is a channel impulse response tap index relative to a first arrival path or is based on Cx1/Cx2 sampling.

Clause 17. The method of any of clauses 1-16, wherein the sensing node comprises one of a user equipment or a base station.

Clause 18. The method of any of clauses 1-17, wherein the network node from which the sensing assistance data is received comprises a network server or the sensing node is a sensing receiver node and the network node is a sensing transmitter node.

Clause 19. A sensing node in a wireless network configured for supporting radio frequency (RF) sensing in the wireless network, comprising: at least one transceiver; at least one memory; and at least one processor coupled to the at least one transceiver, and the at least one memory, wherein the at least one processor is configured to: receive, via the at least one transceiver, sensing assistance data from a network node comprising information for Doppler estimation from RF signals; receive, via the at least one transceiver, the RF signals; and perform a Doppler estimation using the RF signals and the sensing assistance data.

Clause 20. The sensing node of clause 19, wherein the RF signals comprise positioning reference signals (PRS), and wherein the information for Doppler estimation comprises an indication of phase coherency of the PRS.

Clause 21. The sensing node of clause 20, wherein the indication of phase coherency of the PRS comprises an indication of at least one group of PRS with phase coherency, and wherein performing the Doppler estimation is based on the at least one group of PRS with phase coherency.

Clause 22. The sensing node of any of clauses 20-21, wherein the indication of phase coherency of the PRS comprises an indication of at least one transmission reception point (TRP) that supports transmission of PRS with phase coherency, and wherein performing the Doppler estimation is based on PRS received from the at least one TRP that supports transmission of PRS with phase coherency.

Clause 23. The sensing node of clause 22, wherein the indication of phase coherency of the PRS further comprises an indication of at least one group of PRS with phase coherency from the at least one TRP that supports transmission of PRS with phase coherency, and wherein performing the Doppler estimation is further based on the at least one group of PRS with phase coherency.

Clause 24. The sensing node of any of clauses 20-23, wherein the indication of phase coherency of the PRS comprises an indication of a frequency layer that supports transmission of PRS with phase coherency, and wherein performing the Doppler estimation is based on PRS received from the frequency layer that supports transmission of PRS with phase coherency.

Clause 25. The sensing node of clause 24, wherein the indication of phase coherency of the PRS further comprises an indication of the PRS in the frequency layer that do not support Doppler estimation, wherein performing the Doppler estimation is based on an exclusion of the PRS that do not support Doppler estimation.

Clause 26. The sensing node of any of clauses 20-25, wherein the indication of phase coherency of the PRS comprises an indication of any combination of frequency layer, transmission reception point (TRP), PRS resource set, and PRS resource that supports phase coherency.

Clause 27. The sensing node of any of clauses 19-26, wherein the information for Doppler estimation comprises an indication of positioning reference signals (PRS) and reference signals that are associated for Doppler estimation.

Clause 28. The sensing node of clause 27, wherein the PRS and the reference signals that are associated for Doppler estimation are Quasi-Colocation (QCL) signals.

Clause 29. The sensing node of any of clauses 27-28, wherein the reference signals are configured close to the PRS in time domain.

Clause 30. The sensing node of any of clauses 27-29, wherein the reference signals comprise at least one of tracking reference signals (TRS) or a radar waveform.

Clause 31. The sensing node of clause 30, wherein sensing assistance data further comprises a waveform type and parameters for the radar waveform.

Clause 32. The sensing node of any of clauses 19-31, wherein the information for Doppler estimation comprises information for a search window for the Doppler estimation comprising an expected Doppler and an expected Doppler uncertainty.

Clause 33. The sensing node of clause 32, wherein the RF signals comprise positioning reference signals (PRS), and wherein the expected Doppler and the expected Doppler uncertainty are defined in multiple sets for each PRS resource or each PRS resource set.

Clause 34. The sensing node of any of clauses 32-33, wherein sensing assistance data is specific to the sensing node, and each set of the expected Doppler and the expected Doppler uncertainty is associated with a path index, wherein the path index is a channel impulse response tap index relative to a first arrival path or is based on Cx1/Cx2 sampling.

Clause 35. The sensing node of any of clauses 19-34, wherein the sensing node comprises one of a user equipment or a base station.

Clause 36. The sensing node of any of clauses 19-35, wherein the network node from which the sensing assistance data is received comprises a network server or the sensing node is a sensing receiver node and the network node is a sensing transmitter node.

Clause 37. A sensing node in a wireless network configured for supporting radio frequency (RF) sensing in the wireless network, comprising: means for receiving sensing assistance data from a network node comprising information for Doppler estimation from RF signals; means for receiving the RF signals; and means for performing a Doppler estimation using the RF signals and the sensing assistance data.

Clause 38. A non-transitory storage medium including program code stored thereon, the program code is operable to configure at least one processor in a sensing node in a wireless network for supporting radio frequency (RF) sensing in the wireless network, the program code comprising instructions to: receive sensing assistance data from a network node comprising information for Doppler estimation from RF signals; receive the RF signals; and perform a Doppler estimation using the RF signals and the sensing assistance data.

Clause 39. A method performed by a network node in a wireless network for supporting radio frequency (RF) sensing in the wireless network, comprising: obtaining sensing assistance data for a sensing node in the wireless network, the sensing assistance data comprising information for Doppler estimation from RF signals; and sending to the sensing node the sensing assistance data comprising the information for Doppler estimation from the RF signals.

Clause 40. The method of clause 39, further comprising receiving a sensing report from the sensing node.

Clause 41. The method of any of clauses 39-40, wherein the RF signals comprise positioning reference signals (PRS), and wherein the information for Doppler estimation comprises an indication of phase coherency of the PRS.

Clause 42. The method of clause 41, wherein the indication of phase coherency of the PRS comprises an indication of at least one group of PRS with phase coherency.

Clause 43. The method of any of clauses 41-42, wherein the indication of phase coherency of the PRS comprises an indication of at least one transmission reception point (TRP) that supports transmission of PRS with phase coherency.

Clause 44. The method of clause 43, wherein the indication of phase coherency of the PRS further comprises an indication of at least one group of PRS with phase coherency from the at least one TRP that supports transmission of PRS with phase coherency.

Clause 45. The method of any of clauses 41-44, wherein the indication of phase coherency of the PRS comprises an indication of a frequency layer that supports transmission of PRS with phase coherency.

Clause 46. The method of clause 45, wherein the indication of phase coherency of the PRS further comprises an indication of the PRS in the frequency layer that do not support Doppler estimation.

Clause 47. The method of any of clauses 41-46, wherein the indication of phase coherency of the PRS comprises an indication of any combination of frequency layer, transmission reception point (TRP), PRS resource set, and PRS resource that supports phase coherency.

Clause 48. The method of any of clauses 39-47, wherein the information for Doppler estimation comprises an indication of positioning reference signals (PRS) and reference signals that are associated for Doppler estimation.

Clause 49. The method of clause 48, wherein the PRS and the reference signals that are associated for Doppler estimation are Quasi-Colocation (QCL) signals.

Clause 50. The method of any of clauses 48-49, wherein the reference signals are configured close to the PRS in time domain.

Clause 51. The method of any of clauses 48-50, wherein the reference signals comprise at least one of tracking reference signals (TRS) or a radar waveform.

Clause 52. The method of clause 51, wherein sensing assistance data further comprises a waveform type and parameters for the radar waveform.

Clause 53. The method of any of clauses 39-52, wherein the information for Doppler estimation comprises information for a search window for the Doppler estimation comprising an expected Doppler and an expected Doppler uncertainty.

Clause 54. The method of clause 53, wherein the RF signals comprise positioning reference signals (PRS), and wherein the expected Doppler and the expected Doppler uncertainty are defined in multiple sets for each PRS resource or each PRS resource set.

Clause 55. The method of any of clauses 53-54, wherein sensing assistance data is specific to the sensing node, and each set of the expected Doppler and the expected Doppler uncertainty is associated with a path index, wherein the path index is a channel impulse response tap index relative to a first arrival path or is based on Cx1/Cx2 sampling.

Clause 56. The method of any of clauses 39-55, wherein the sensing node comprises one of a user equipment or a base station.

Clause 57. The method of any of clauses 39-56, wherein the network node comprises a network server or the sensing node is a sensing receiver node and the network node is a sensing transmitter node.

Clause 58. A network node in a wireless network configured for supporting radio frequency (RF) sensing in the wireless network, comprising: at least one transceiver; at least one memory; and at least one processor coupled to the at least one transceiver, and the at least one memory, wherein the at least one processor is configured to: obtain sensing assistance data for a sensing node in the wireless network, the sensing assistance data comprising information for Doppler estimation from RF signals; and send, via the at least one transceiver, to the sensing node the sensing assistance data comprising the information for Doppler estimation from the RF signals.

Clause 59. The network node of clause 58, further comprising receiving a sensing report from the sensing node.

Clause 60. The network node of any of clauses 58-59, wherein the RF signals comprise positioning reference signals (PRS), and wherein the information for Doppler estimation comprises an indication of phase coherency of the PRS.

Clause 61. The network node of clause 60, wherein the indication of phase coherency of the PRS comprises an indication of at least one group of PRS with phase coherency.

Clause 62. The network node of any of clauses 60-61, wherein the indication of phase coherency of the PRS comprises an indication of at least one transmission reception point (TRP) that supports transmission of PRS with phase coherency.

Clause 63. The network node of clause 62, wherein the indication of phase coherency of the PRS further comprises an indication of at least one group of PRS with phase coherency from the at least one TRP that supports transmission of PRS with phase coherency.

Clause 64. The network node of any of clauses 60-63, wherein the indication of phase coherency of the PRS comprises an indication of a frequency layer that supports transmission of PRS with phase coherency.

Clause 65. The network node of clause 64, wherein the indication of phase coherency of the PRS further comprises an indication of the PRS in the frequency layer that do not support Doppler estimation.

Clause 66. The network node of any of clauses 60-65, wherein the indication of phase coherency of the PRS comprises an indication of any combination of frequency layer, transmission reception point (TRP), PRS resource set, and PRS resource that supports phase coherency.

Clause 67. The network node of any of clauses 58-66, wherein the information for Doppler estimation comprises an indication of positioning reference signals (PRS) and reference signals that are associated for Doppler estimation.

Clause 68. The network node of clause 67, wherein the PRS and the reference signals that are associated for Doppler estimation are Quasi-Colocation (QCL) signals.

Clause 69. The network node of any of clauses 67-68, wherein the reference signals are configured close to the PRS in time domain.

Clause 70. The network node of any of clauses 67-69, wherein the reference signals comprise at least one of tracking reference signals (TRS) or a radar waveform.

Clause 71. The network node of clause 70, wherein sensing assistance data further comprises a waveform type and parameters for the radar waveform.

Clause 72. The network node of any of clauses 58-71, wherein the information for Doppler estimation comprises information for a search window for the Doppler estimation comprising an expected Doppler and an expected Doppler uncertainty.

Clause 73. The network node of clause 72, wherein the RF signals comprise positioning reference signals (PRS), and wherein the expected Doppler and the expected Doppler uncertainty are defined in multiple sets for each PRS resource or each PRS resource set.

Clause 74. The network node of any of clauses 72-73, wherein sensing assistance data is specific to the sensing node, and each set of the expected Doppler and the expected Doppler uncertainty is associated with a path index, wherein the path index is a channel impulse response tap index relative to a first arrival path or is based on Cx1/Cx2 sampling.

Clause 75. The network node of any of clauses 58-74, wherein the sensing node comprises one of a user equipment or a base station.

Clause 76. The network node of any of clauses 58-75, wherein the network node comprises a network server or the sensing node is a sensing receiver node and the network node is a sensing transmitter node.

Clause 77. A network node in a wireless network configured for supporting radio frequency (RF) sensing in the wireless network, comprising: means for obtaining sensing assistance data for a sensing node in the wireless network, the sensing assistance data comprising information for Doppler estimation from RF signals; and means for sending to the sensing node the sensing assistance data comprising the information for Doppler estimation from the RF signals.

Clause 78. A non-transitory storage medium including program code stored thereon, the program code is operable to configure at least one processor in a network node in a wireless network for supporting radio frequency (RF) sensing in the wireless network, the program code comprising instructions to: obtain sensing assistance data for a sensing node in the wireless network, the sensing assistance data comprising information for Doppler estimation from RF signals; and send to the sensing node the sensing assistance data comprising the information for Doppler estimation from the RF signals.

Clause 79. A method performed by a sensing node in a wireless network for supporting radio frequency (RF) sensing in the wireless network, comprising: receiving sensing assistance data from a network node comprising an association of at least one positioning reference signal (PRS) resource and at least one reference point object (RPO); receiving PRS resources; and performing sensing based on the PRS resources and the association of the at least one PRS resource and the at least one RPO.

Clause 80. The method of clause 79, wherein performing sensing based on the PRS resources and the association of the at least one PRS resource and the at least one RPO comprises excluding the at least one PRS resource that is associated from the at least one RPO from the PRS resources used for performing sensing.

Clause 81. The method of any of clauses 79-80, wherein the sensing assistance data comprises an identifier and a location of each of the at least one RPO.

Clause 82. The method of any of clauses 79-81, wherein the sensing assistance data comprises for each of the at least one PRS resource a list of RPOs comprising an identifier and a location for each RPO in the list of RPOs.

Clause 83. The method of any of clauses 79-82, wherein for each of the at least one RPO, the sensing assistance data comprises at least one of a class, a radar cross section, a material, a size, a shape, or any combination thereof.

Clause 84. The method of any of clauses 79-83, wherein the at least one PRS resource is associated with multiple RPOs, and the at least one RPO is associated with multiple PRS resources.

Clause 85. The method of any of clauses 79-84, wherein the sensing node comprises one of a user equipment or a base station.

Clause 86. The method of any of clauses 79-85, wherein the network node from which the sensing assistance data is received comprises a network server or the sensing node is a sensing receiver node and the network node is a sensing transmitter node.

Clause 87. A sensing node in a wireless network configured for supporting radio frequency (RF) sensing in the wireless network, comprising: at least one transceiver; at least one memory; and at least one processor coupled to the at least one transceiver, and the at least one memory, wherein the at least one processor is configured to: receive, via the at least one transceiver, sensing assistance data from a network node comprising an association of at least one positioning reference signal (PRS) resource and at least one reference point object (RPO); receive, via the at least one transceiver, PRS resources; and perform sensing based on the PRS resources and the association of the at least one PRS resource and the at least one RPO.

Clause 88. The sensing node of clause 87, wherein the at least one processor is configured to perform sensing based on the PRS resources and the association of the at least one PRS resource and the at least one RPO by being configured to exclude the at least one PRS resource that is associated from the at least one RPO from the PRS resources used for performing sensing.

Clause 89. The sensing node of any of clauses 87-88, wherein the sensing assistance data comprises an identifier and a location of each of the at least one RPO.

Clause 90. The sensing node of any of clauses 87-89, wherein the sensing assistance data comprises for each of the at least one PRS resource a list of RPOs comprising an identifier and a location for each RPO in the list of RPOs.

Clause 91. The sensing node of any of clauses 87-90, wherein for each of the at least one RPO, the sensing assistance data comprises at least one of a class, a radar cross section, a material, a size, a shape, or any combination thereof.

Clause 92. The sensing node of any of clauses 87-91, wherein the at least one PRS resource is associated with multiple RPOs, and the at least one RPO is associated with multiple PRS resources.

Clause 93. The sensing node of any of clauses 87-92, wherein the sensing node comprises one of a user equipment or a base station.

Clause 94. The sensing node of any of clauses 87-93, wherein the network node from which the sensing assistance data is received comprises a network server or the sensing node is a sensing receiver node and the network node is a sensing transmitter node.

Clause 95. A sensing node in a wireless network configured for supporting radio frequency (RF) sensing in the wireless network, comprising: receive sensing assistance data from a network node comprising an association of at least one positioning reference signal (PRS) resource and at least one reference point object (RPO); receive PRS resources; and perform sensing based on the PRS resources and the association of the at least one PRS resource and the at least one RPO.

Clause 96. A non-transitory storage medium including program code stored thereon, the program code is operable to configure at least one processor in a sensing node in a wireless network for supporting radio frequency (RF) sensing in the wireless network, the program code comprising instructions to: receive sensing assistance data from a network node comprising an association of at least one positioning reference signal (PRS) resource and at least one reference point object (RPO); receive PRS resources; and perform sensing based on the PRS resources and the association of the at least one PRS resource and the at least one RPO.

Clause 97. A method performed by a network node in a wireless network for supporting radio frequency (RF) sensing in the wireless network, comprising: obtaining sensing assistance data for a sensing node in the wireless network, the sensing assistance data comprising an association of at least one positioning reference signal (PRS) resource and at least one reference point object (RPO); and sending to the sensing node the sensing assistance data comprising the association of the at least one PRS resource and the at least one RPO.

Clause 98. The method of clause 97, wherein the at least one RPO is determined based on a three dimensional map and one or more sensing measurement reports received from one or more sensing nodes.

Clause 99. The method of any of clauses 97-98, wherein the sensing assistance data comprises an identifier and a location of each of the at least one RPO.

Clause 100. The method of any of clauses 97-99, wherein the sensing assistance data comprises for each of the at least one PRS resource a list of RPOs comprising an identifier and a location for each RPO in the list of RPOs.

Clause 101. The method of any of clauses 97-100, wherein for each of the at least one RPO, the sensing assistance data comprises at least one of a class, a radar cross section, a material, a size, a shape, or any combination thereof.

Clause 102. The method of any of clauses 97-101, wherein the at least one PRS resource is associated with multiple RPOs, and the at least one RPO is associated with multiple PRS resources.

Clause 103. The method of any of clauses 97-102, wherein the sensing node comprises one of a user equipment or a base station.

Clause 104. The method of any of clauses 97-103, wherein the network node comprises a network server or the sensing node is a sensing receiver node and the network node is a sensing transmitter node.

Clause 105. A network node in a wireless network configured for supporting radio frequency (RF) sensing in the wireless network, comprising: at least one transceiver; at least one memory; and at least one processor coupled to the at least one transceiver, and the at least one memory, wherein the at least one processor is configured to: obtain sensing assistance data for a sensing node in the wireless network, the sensing assistance data comprising an association of at least one positioning reference signal (PRS) resource and at least one reference point object (RPO); and send, via the at least one transceiver, to the sensing node the sensing assistance data comprising the association of the at least one PRS resource and the at least one RPO.

Clause 106. The network node of clause 105, wherein the at least one RPO is determined based on a three dimensional map and one or more sensing measurement reports received from one or more sensing nodes.

Clause 107. The network node of any of clauses 105-106, wherein the sensing assistance data comprises an identifier and a location of each of the at least one RPO.

Clause 108. The network node of any of clauses 105-107, wherein the sensing assistance data comprises for each of the at least one PRS resource a list of RPOs comprising an identifier and a location for each RPO in the list of RPOs.

Clause 109. The network node of any of clauses 105-108, wherein for each of the at least one RPO, the sensing assistance data comprises at least one of a class, a radar cross section, a material, a size, a shape, or any combination thereof.

Clause 110. The network node of any of clauses 105-109, wherein the at least one PRS resource is associated with multiple RPOs, and the at least one RPO is associated with multiple PRS resources.

Clause 111. The network node of any of clauses 105-110, wherein the sensing node comprises one of a user equipment or a base station.

Clause 112. The network node of any of clauses 105-111, wherein the network node comprises a network server or the sensing node is a sensing receiver node and the network node is a sensing transmitter node.

Clause 113. A network node in a wireless network configured for supporting radio frequency (RF) sensing in the wireless network, comprising: means for obtaining sensing assistance data for a sensing node in the wireless network, the sensing assistance data comprising an association of at least one positioning reference signal (PRS) resource and at least one reference point object (RPO); and means for sending to the sensing node the sensing assistance data comprising the association of the at least one PRS resource and the at least one RPO.

Clause 114. A non-transitory storage medium including program code stored thereon, the program code is operable to configure at least one processor in a network node in a wireless network for supporting radio frequency (RF) sensing in the wireless network, the program code comprising instructions to: obtain sensing assistance data for a sensing node in the wireless network, the sensing assistance data comprising an association of at least one positioning reference signal (PRS) resource and at least one reference point object (RPO); and send to the sensing node the sensing assistance data comprising the association of the at least one PRS resource and the at least one RPO.

Clause 115. A method performed by a sensing node in a wireless network for supporting radio frequency (RF) sensing in the wireless network, comprising: receiving sensing assistance data from a network node comprising beam pattern information for positioning reference signal (PRS) resources for beam coordination for RF sensing; receiving PRS resources; and performing sensing based on the PRS resources and the beam pattern information.

Clause 116. The method of clause 115, wherein the sensing assistance data further comprises an indication of a frequency layer that supports RF sensing, and the beam pattern information for the PRS resources for beam coordination for RF sensing is for PRS resources in the frequency layer.

Clause 117. The method of any of clauses 116-116, wherein an Angle of Departure (AoD) based positioning sessions is not configured for the sensing node.

Clause 118. The method of any of clauses 115-117, wherein PRS resources support Angle of Departure (AoD) based positioning, and the beam pattern information for the PRS resources for beam coordination for RF sensing comprises assistance data for the AoD based positioning.

Clause 119. The method of any of clauses 115-118, wherein the beam pattern information for the PRS resources for beam coordination for RF sensing comprises an expected beam direction and an expected beam direction uncertainty.

Clause 120. The method of any of clauses 115-119, wherein the sensing node comprises one of a user equipment or a base station.

Clause 121. The method of any of clauses 115-120, wherein the network node from which the sensing assistance data is received comprises a network server or the sensing node is a sensing receiver node and the network node is a sensing transmitter node.

Clause 122. A sensing node in a wireless network configured for supporting radio frequency (RF) sensing in the wireless network, comprising: at least one transceiver; at least one memory; and at least one processor coupled to the at least one transceiver, and the at least one memory, wherein the at least one processor is configured to: receive, via the at least one transceiver, sensing assistance data from a network node comprising beam pattern information for positioning reference signal (PRS) resources for beam coordination for RF sensing; receive, via the at least one transceiver, PRS resources; and perform sensing based on the PRS resources and the beam pattern information.

Clause 123. The sensing node of clause 122, wherein the sensing assistance data further comprises an indication of a frequency layer that supports RF sensing, and the beam pattern information for the PRS resources for beam coordination for RF sensing is for PRS resources in the frequency layer.

Clause 124. The sensing node of any of clauses 122-123, wherein an Angle of Departure (AoD) based positioning sessions is not configured for the sensing node.

Clause 125. The sensing node of any of clauses 122-124, wherein PRS resources support Angle of Departure (AoD) based positioning, and the beam pattern information for the PRS resources for beam coordination for RF sensing comprises assistance data for the AoD based positioning.

Clause 126. The sensing node of any of clauses 122-125, wherein the beam pattern information for the PRS resources for beam coordination for RF sensing comprises an expected beam direction and an expected beam direction uncertainty.

Clause 127. The sensing node of any of clauses 122-126, wherein the sensing node comprises one of a user equipment or a base station.

Clause 128. The sensing node of any of clauses 122-127, wherein the network node from which the sensing assistance data is received comprises a network server or the sensing node is a sensing receiver node and the network node is a sensing transmitter node.

Clause 129. A sensing node in a wireless network configured for supporting radio frequency (RF) sensing in the wireless network, comprising: means for receiving sensing assistance data from a network node comprising beam pattern information for positioning reference signal (PRS) resources for beam coordination for RF sensing; means for receiving PRS resources; and means for performing sensing based on the PRS resources and the beam pattern information.

Clause 130. A non-transitory storage medium including program code stored thereon, the program code is operable to configure at least one processor in a sensing node in a wireless network for supporting radio frequency (RF) sensing in the wireless network, the program code comprising instructions to: receive sensing assistance data from a network node comprising beam pattern information for positioning reference signal (PRS) resources for beam coordination for RF sensing; receive PRS resources; and performing sensing based on the PRS resources and the beam pattern information.

Clause 131. A method performed by a network node in a wireless network for supporting radio frequency (RF) sensing in the wireless network, comprising: obtaining sensing assistance data for a sensing node in the wireless network, the sensing assistance data comprising beam pattern information for positioning reference signal (PRS) resources for beam coordination for RF sensing; and sending to the sensing node the sensing assistance data comprising the beam pattern information for the PRS resources for beam coordination for RF sensing.

Clause 132. The method of clause 131, wherein the sensing assistance data further comprises an indication of a frequency layer that supports RF sensing, and the beam pattern information for the PRS resources for beam coordination for RF sensing is for PRS resources in the frequency layer.

Clause 133. The method of clause 132, wherein an Angle of Departure (AoD) based positioning sessions is not configured for the sensing node.

Clause 134. The method of any of clauses 131-133, wherein PRS resources support Angle of Departure (AoD) based positioning, and the beam pattern information for the PRS resources for beam coordination for RF sensing comprises assistance data for the AoD based positioning.

Clause 135. The method of any of clauses 131-134, wherein the beam pattern information for the PRS resources for beam coordination for RF sensing comprises an expected beam direction and an expected beam direction uncertainty.

Clause 136. The method of any of clauses 131-135, wherein the sensing node comprises one of a user equipment or a base station.

Clause 137. The method of any of clauses 131-136, wherein the network node from which the sensing assistance data is received comprises a network server or the sensing node is a sensing receiver node and the network node is a sensing transmitter node.

Clause 138. A network node in a wireless network configured for supporting radio frequency (RF) sensing in the wireless network, comprising: at least one transceiver; at least one memory; and at least one processor coupled to the at least one transceiver, and the at least one memory, wherein the at least one processor is configured to: obtain sensing assistance data for a sensing node in the wireless network, the sensing assistance data comprising beam pattern information for positioning reference signal (PRS) resources for beam coordination for RF sensing; and send, via the at least one transceiver, to the sensing node the sensing assistance data comprising the beam pattern information for the PRS resources for beam coordination for RF sensing.

Clause 139. The network node of clause 138, wherein the sensing assistance data further comprises an indication of a frequency layer that supports RF sensing, and the beam pattern information for the PRS resources for beam coordination for RF sensing is for PRS resources in the frequency layer.

Clause 140. The network node of clause 139, wherein an Angle of Departure (AoD) based positioning sessions is not configured for the sensing node.

Clause 141. The network node of any of clauses 138-140, wherein PRS resources support Angle of Departure (AoD) based positioning, and the beam pattern information for the PRS resources for beam coordination for RF sensing comprises assistance data for the AoD based positioning.

Clause 142. The network node of any of clauses 138-141, wherein the beam pattern information for the PRS resources for beam coordination for RF sensing comprises an expected beam direction and an expected beam direction uncertainty.

Clause 143. The network node of any of clauses 138-142, wherein the sensing node comprises one of a user equipment or a base station.

Clause 144. The network node of any of clauses 138-143, wherein the network node from which the sensing assistance data is received comprises a network server or the sensing node is a sensing receiver node and the network node is a sensing transmitter node.

Clause 145. A network node in a wireless network configured for supporting radio frequency (RF) sensing in the wireless network, comprising: means for obtaining sensing assistance data for a sensing node in the wireless network, the sensing assistance data comprising beam pattern information for positioning reference signal (PRS) resources for beam coordination for RF sensing; and means for sending to the sensing node the sensing assistance data comprising the beam pattern information for the PRS resources for beam coordination for RF sensing.

Clause 146. A non-transitory storage medium including program code stored thereon, the program code is operable to configure at least one processor in a network node in a wireless network for supporting radio frequency (RF) sensing in the wireless network, the program code comprising instructions to: obtain sensing assistance data for a sensing node in the wireless network, the sensing assistance data comprising beam pattern information for positioning reference signal (PRS) resources for beam coordination for RF sensing; and send to the sensing node the sensing assistance data comprising the beam pattern information for the PRS resources for beam coordination for RF sensing.

Therefore, it is intended that claimed subject matter not be limited to the particular examples disclosed, but that such claimed subject matter may also include all aspects falling within the scope of appended claims, and equivalents thereof.

What is claimed is:

1. A method performed by a sensing node in a wireless network for supporting radio frequency (RF) sensing in the wireless network, comprising:
    receiving sensing assistance data from a network node comprising information for Doppler estimation from RF signals, the RF signals comprising positioning reference signals (PRS), and the information for Doppler estimation comprising an indication of phase coherency of the PRS;
    receiving the RF signals; and
    performing a Doppler estimation using the RF signals and the sensing assistance data.

2. The method of claim 1, wherein the indication of phase coherency of the PRS comprises an indication of at least one group of PRS with phase coherency, and wherein performing the Doppler estimation is based on the at least one group of PRS with phase coherency.

3. The method of claim 1, wherein the indication of phase coherency of the PRS comprises an indication of at least one transmission reception point (TRP) that supports transmission of PRS with phase coherency, and wherein performing the Doppler estimation is based on PRS received from the at least one TRP that supports transmission of PRS with phase coherency.

4. The method of claim 1, wherein the indication of phase coherency of the PRS comprises an indication of a frequency layer that supports transmission of PRS with phase coherency, and wherein performing the Doppler estimation is based on PRS received from the frequency layer that supports transmission of PRS with phase coherency.

5. The method of claim 1, wherein the indication of phase coherency of the PRS comprises an indication of any combination of frequency layer, transmission reception point (TRP), PRS resource set, and PRS resource that supports phase coherency.

6. The method of claim 1, wherein the information for Doppler estimation comprises an indication of positioning reference signals (PRS) and reference signals that are associated for Doppler estimation.

7. The method of claim 6, wherein the PRS and the reference signals that are associated for Doppler estimation are Quasi-Colocation (QCL) signals.

8. The method of claim 6, wherein the reference signals are configured close to the PRS in time domain.

9. The method of claim 6, wherein the reference signals comprise at least one of tracking reference signals (TRS) or a radar waveform.

10. The method of claim 1, wherein the information for Doppler estimation further comprises information for a search window for the Doppler estimation comprising an expected Doppler and an expected Doppler uncertainty.

11. The method of claim 10, wherein the expected Doppler and the expected Doppler uncertainty are defined in multiple sets for each PRS resource or each PRS resource set.

12. The method of claim 10, wherein sensing assistance data is specific to the sensing node, and each set of the expected Doppler and the expected Doppler uncertainty is associated with a path index, wherein the path index is a channel impulse response tap index relative to a first arrival path or is based on Cx1/Cx2 sampling.

13. The method of claim 1, wherein the network node from which the sensing assistance data is received comprises a network server or the sensing node is a sensing receiver node and the network node is a sensing transmitter node.

14. A sensing node in a wireless network configured for supporting radio frequency (RF) sensing in the wireless network, comprising:
    at least one transceiver; at least one memory; and
    at least one processor coupled to the at least one transceiver, and the at least one memory, wherein the at least one processor is configured to:
        receive, via the at least one transceiver, sensing assistance data from a network node comprising information for Doppler estimation from RF signals, the RF signals comprising positioning reference signals (PRS), and the information for Doppler estimation comprising an indication of phase coherency of the PRS;
        receive, via the at least one transceiver, the RF signals; and
        perform a Doppler estimation using the RF signals and the sensing assistance data.

15. The sensing node of claim 14, wherein the indication of phase coherency of the PRS comprises an indication of at least one group of PRS with phase coherency, and wherein performing the Doppler estimation is based on the at least one group of PRS with phase coherency.

16. The sensing node of claim 14, wherein the indication of phase coherency of the PRS comprises an indication of at least one transmission reception point (TRP) that supports transmission of PRS with phase coherency, and wherein performing the Doppler estimation is based on PRS received from the at least one TRP that supports transmission of PRS with phase coherency.

17. The sensing node of claim 14, wherein the indication of phase coherency of the PRS comprises an indication of a frequency layer that supports transmission of PRS with phase coherency, and wherein performing the Doppler estimation is based on PRS received from the frequency layer that supports transmission of PRS with phase coherency.

18. The sensing node of claim 14, wherein the indication of phase coherency of the PRS comprises an indication of any combination of frequency layer, transmission reception point (TRP), PRS resource set, and PRS resource that supports phase coherency.

19. The sensing node of claim 14, wherein the information for Doppler estimation comprises an indication of positioning reference signals (PRS) and reference signals that are associated for Doppler estimation.

20. The sensing node of claim 19, wherein the PRS and the reference signals that are associated for Doppler estimation are Quasi-Colocation (QCL) signals.

21. The sensing node of claim 19, wherein the reference signals are configured close to the PRS in time domain.

22. The sensing node of claim 19, wherein the reference signals comprise at least one of tracking reference signals (TRS) or a radar waveform.

23. The sensing node of claim 14, wherein the information for Doppler estimation further comprises information for a search window for the Doppler estimation comprising an expected Doppler and an expected Doppler uncertainty.

24. The sensing node of claim 23, wherein the expected Doppler and the expected Doppler uncertainty are defined in multiple sets for each PRS resource or each PRS resource set.

25. The sensing node of claim 23, wherein sensing assistance data is specific to the sensing node, and each set of the expected Doppler and the expected Doppler uncertainty is associated with a path index, wherein the path index is a channel impulse response tap index relative to a first arrival path or is based on Cx1/Cx2 sampling.

26. The sensing node of claim 14, wherein the network node from which the sensing assistance data is received comprises a network server or the sensing node is a sensing receiver node and the network node is a sensing transmitter node.

27. A sensing node in a wireless network configured for supporting radio frequency (RF) sensing in the wireless network, comprising:
    means for receiving sensing assistance data from a network node comprising information for Doppler estimation from RF signals, the RF signals comprising positioning reference signals (PRS), and the information for Doppler estimation comprising an indication of phase coherency of the PRS;
    means for receiving the RF signals; and
    means for performing a Doppler estimation using the RF signals and the sensing assistance data.

28. A non-transitory storage medium including program code stored thereon, the program code is operable to configure at least one processor in a sensing node in a wireless network for supporting radio frequency (RF) sensing in the wireless network, the program code comprising instructions to:
    receive sensing assistance data from a network node comprising information for Doppler estimation from RF signals, the RF signals comprising positioning reference signals (PRS), and the information for Doppler estimation comprising an indication of phase coherency of the PRS;
    receive the RF signals; and
    perform a Doppler estimation using the RF signals and the sensing assistance data.

\* \* \* \* \*